(12) United States Patent
Watanabe et al.

(10) Patent No.: US 7,918,007 B2
(45) Date of Patent: Apr. 5, 2011

(54) CAULKED ASSEMBLY OF METAL PLATE BODY WITH COLUMNAR BODY, CAULKED ASSEMBLY OF RESIN MOLDED BODY WITH COLUMNAR BODY, AND METHOD FOR PRODUCING THE SAME

(75) Inventors: Hiroyuki Watanabe, Osaka (JP); Hisanori Kawasaki, Osaka (JP); Hidemitsu Watanabe, Osaka (JP)

(73) Assignee: APS Japan Co., Ltd., Osaka-Shi (JP)

( * ) Notice: Subject to any disclaimer, the term of this patent is extended or adjusted under 35 U.S.C. 154(b) by 1050 days.

(21) Appl. No.: 11/725,551

(22) Filed: Mar. 20, 2007

(65) Prior Publication Data

US 2007/0226984 A1 Oct. 4, 2007

(30) Foreign Application Priority Data

| Mar. 20, 2006 | (JP) | ................ | 2006-077544 |
| Jul. 20, 2006 | (JP) | ................ | 2006-198309 |
| Jul. 31, 2006 | (JP) | ................ | 2006-207704 |
| Mar. 5, 2007 | (JP) | ................ | 2007-053670 |
| Mar. 9, 2007 | (JP) | ................ | 2007-060514 |

(51) Int. Cl.
*B23P 11/00* (2006.01)

(52) U.S. Cl. .......................... 29/509; 29/505

(58) Field of Classification Search ............... 29/505, 29/509, 458, 761, 821, 243.5, 281.1, 283.5, 29/469.5, 510, 428
See application file for complete search history.

(56) References Cited

U.S. PATENT DOCUMENTS 5,602,698 A * 2/1997 Miyazaki et al. .......... 360/244.6
* cited by examiner

*Primary Examiner* — John C Hong
(74) *Attorney, Agent, or Firm* — Kratz, Quintos & Hanson, LLP

(57) ABSTRACT

The present invention provides a caulked assembly to be manufactured at low cost, and maintain sufficient caulking strength, and the manufacturing method and apparatus thereof. The manufacturing method comprises steps of forming a mounting hole for inserting and assembling a columnar body in a metal plate body, and forming a thick part along an inner circumferential edge of a mounting hole; forming a circumferential groove with a predetermined depth at an assembled position of a outer circumferential surface of the columnar body inserted into the mounting hole; inserting the columnar body into the mounting hole to set to the assembled position where the thick part is opposed to the circumferential groove; and caulking for compressively pressing the thick part from an axial direction of the columnar body to plastically deform the thick part in a center direction of the mounting hole to bite the thick part into the circumferential groove.

14 Claims, 33 Drawing Sheets

(a)

(b)

(a)

(b)

(a)

(b)

(a)

(b)

(a)

(b)

(a)

(b)

(a)

(b)

(a)            (b)

(a)

(b)

(c)

CAULKED ASSEMBLY OF METAL PLATE BODY WITH COLUMNAR BODY, CAULKED ASSEMBLY OF RESIN MOLDED BODY WITH COLUMNAR BODY, AND METHOD FOR PRODUCING THE SAME

BACKGROUND OF THE INVENTION

1. Field of the Invention

The present invention relates to a high-strength caulking technique capable of firmly fixing a hollow or solid columnar body to a metal plate body. Particularly, the present invention relates to a high-strength caulking technique capable of firmly fixing a hollow or solid columnar body to a plate body made of magnesium or a magnesium alloy. Also, the present invention relates to a caulking technique of a resin molded body made of a thermoplastic resin with a hollow or solid columnar body made of a material having a higher melting point than that of the thermoplastic resin.

2. Description of the Background Art

Caulking of this kind of a plate body with a columnar body has been conventionally performed as follows. In Patent Reference 1, a flange part is formed at the middle part of a shaft body side as shaft caulking, and a circular hole is punched in the side of a plate body which is a press component as a caulked object. The tip part of the shaft body inserted into the circular hole is crushed by a caulking machine for exclusive use. The press component is sandwiched and caulked between the crushed head part of the shaft body and the flange part. Or, a more complicated specific shape is formed at the side of the shaft body, and the columnar body is joined to the plate body by press-fitting the shaft body into the circular hole opened in the press component.

However, a large flange part must be provided at the middle part of the shaft body in order to sandwich the press component between the crushed head part of the shaft body and the flange part. Thereby, it is necessary to cut a shaft material which is about 50% thicker than a shaft diameter required for product use to produce a flange shape, which increases a material cost and a process cost. The manufacture cost is also increased for forming the specific shape, which limits the cost reduction.

On the other hand, in recent years, attentions have been particularly focused on magnesium or a magnesium alloy which has lightweight, easily absorbs vibration and shock, has high electromagnetic wave shielding ability, and has excellent recycling property as case uses for portable phones. However, the worse processability thereof causes extremely difficult caulking of a shaft with, particularly, a thin plate. In Patent Reference 2, the following caulking has been proposed as the caulking of the magnesium or magnesium alloy material. A caulking punch is preheated. While the preheated caulking punch is rotated, the punch is pressed against a top part of a caulking pin as a molded product to performing caulking. This method deforms the shaft to process as in the above Patent Reference 1. This method has had problems such as large-scale devices required for increased manufacture cost and low flexibility of the design because of indispensable shaft deformation.

Conventionally, press fitting or adhesion using a solvent has been mainly performed as a method for fixing a shaft such as a metal or the like to a plate made of, for example, a thermoplastic resin molded body. However, the press fitting could not secure sufficient strength when the thickness of the resin molded plate is reduced. The adhesion method using the solvent could not fundamentally attain the perpendicular degree easily, had inconvenient freedom of the shape, required long junction time to reduce the manufacturing efficiency, and was hardly introduced as a fixing method for precision components.

On the other hand, as a method for ultrasonically melting the resin molded body to press-fit the melted resin, a method using the following device has been proposed (for example, see Patent Reference 3). On a first member made of a thermoplastic resin, a second member having a high melting point was arranged. A processing surface of a processing horn is abutted on a flat surface formed on the second member. While supersonic vibration is applied to the processing horn, pressing force is applied between a receiving tool and the processing surface of the processing horn. The second member is partially press-fitted into the first member melted by supersonic vibration heat to connect and fix the second member to the first member. While a concave portion is formed in at least a part of the processing horn, at least a part of the end part of the flat surface of the second member is located below the concave portion, and the second member is arranged so that the first member melted in press-fitting the second member is turned to the flat surface side of the second member, and covers at least a part of the end part of the flat surface.

However, such a method to press the second member on the first member inevitably causes reduction in the perpendicular degree of the second member. Since the method fixes the first member using the resin turned to the flat surface side of the second member, and the obtained structure requires a sufficient turing amount, firm combination cannot be maintained if the melted resin is blocked in the concave portion of the processing horn, and the management is troublesome. Since the flat surface of the second member is indispensable, second member cannot be applied to the shaft body free from such a flat surface. Furthermore, the first member must have a thickness for embedding the flat surface of the second member, and cannot be applied to the reduction in the thickness of the plate. The processing horn having a specific shape is required for every kind of the second member, and unfortunately, the cost is increased.

[Patent Reference 1]
Japanese Unexamined Patent Publication No. 2003-260529
[Patent Reference 2]
Japanese Unexamined Patent Publication No. 2003-266136
[Patent Reference 3]
Japanese Unexamined Patent Publication No. 59-145112

SUMMARY OF THE INVENTION

Then, in view of the above conditions, it is an object of the present invention to provide a caulked assembly which can be manufactured at low cost easily without providing the flange part at the middle part of the columnar body such as the shaft body and producing the complicated specific shape, and maintain sufficient caulking strength even in the thin plate body, and the manufacturing method thereof.

It is another object of the present invention to provide a caulked assembly which can perform the caulking of the magnesium or magnesium alloy material having worse processability at low cost easily without requiring the rotation or the like of the punch and deforming the shaft, and maintain sufficient caulking strength even in the thin plate body made of the magnesium or magnesium alloy, and a manufacturing method thereof.

Also, it is another object of the present invention to provide an assembly which can sufficiently correspond to the reduction in the thickness of the resin molded plate, realize the firm junction, improve the caulked accuracy such as the perpendicular degree and provide the shape of the caulked member comparatively freely, be assembled at low cost in a short time, and correspond as the fixing method for the precision components, a manufacturing method thereof, and a manufacturing apparatus thereof.

In order to solve the above problems, the present invention provides a method for manufacturing a caulked assembly of a metal plate body with a hollow or solid columnar body, the method comprising the steps of:

forming a mounting hole for inserting and assembling the columnar body in the metal plate body and forming a thick part along an inner circumferential edge of the mounting hole;

forming a circumferential groove with a predetermined depth at an assembled position of an outer circumferential surface of the columnar body inserted into the mounting hole;

inserting the columnar body into the mounting hole of the metal plate body and setting the columnar body to the assembled position where the thick part and the circumferential groove are opposed to each other; and caulking for compressively pressing the thick part from an axial direction of the columnar body to plastically deform the thick part in a center direction of the mounting hole to bite the thick part into the circumferential groove of the columnar body opposed to the thick part.

Herein, the thick part of the mounting hole is preferably formed by burring.

Preferably, the thick part is compressively pressed by a supporting tool and a pressure punch, the supporting tool having an inserting hole for sliding and guiding the columnar body, and abutting and supporting the thick part of the metal plate body to be set to the columnar body from one side of the axial direction, and the pressure punch pressing the thick part directly or indirectly from the other direction of the axial direction.

Furthermore, preferably, a plurality of uneven grooves extending in a direction of crossing a circumferential direction are formed over the whole circumference in the circumferential groove of the columnar body by uneven working.

The present invention provides a method for manufacturing a caulked assembly of a metal plate body with a hollow or solid columnar body, the method comprising the steps of:

forming a mounting hole for inserting and assembling the columnar body in the metal plate body by burring and forming a thick part composed of a cylindrical flange by barring along an inner circumferential edge of the mounting hole;

forming a circumferential groove with a predetermined depth at an assembled position of an outer circumferential surface of the columnar body inserted into the mounting hole;

inserting the columnar body into the mounting hole of the metal plate body to set the columnar body to the assembled position where the thick part and the circumferential groove are opposed to each other; and caulking for compressively pressing the thick part from an axial direction to pressurize the cylindrical flange to make the surface of the thick part approximately flush with that of the metal plate body, forming a ring-shaped swollen flange along the outer circumferential surface of the columnar body on a surface opposite to a surface on which the cylindrical flange is projected, and simultaneously, plastically deforming the swollen flange in a center direction of the mounting hole to bite the swollen flange into the circumferential groove of the columnar body opposed to the swollen flange.

Herein, preferably, the thick part is compressively pressed from the axial direction by a supporting tool and a pressure punch, the supporting tool having an inserting hole for sliding and guiding the columnar body, having a notch groove for forming the swollen flange on an opening edge part of the inserting hole, and abutting and supporting a surface opposite to a surface on which a cylindrical flange of the metal plate body to be set to the columnar body is projected, and the pressure punch pressing the thick part directly or indirectly from the side on which the cylindrical flange is projected.

Preferably, the supporting tool supports the columnar body in the inserting hole so that the columnar body is integrally moved with the end surface thereof abutting on the pressure punch, and the metal plate body is assembled with the columnar body so that the metal plate body is made approximately flush with the end surface of the columnar body by pressing the thick part of the metal plate body by the pressure punch.

Also, in order to solve the above problems, the present invention provides a method for manufacturing a caulked assembly of a metal plate body made of magnesium or a magnesium alloy with a hollow or solid columnar body, the method comprising the steps of:

forming a mounting hole for inserting and assembling the columnar body into the plate body and forming a thick part along an inner circumferential edge of the mounting hole by warm pressing;

forming a circumferential groove with a predetermined depth at an assembled position of an outer circumferential surface of the columnar body inserted into the mounting hole;

inserting the columnar body into the mounting hole of the plate body and setting the columnar body to the assembled position where the thick part and the circumferential groove are opposed to each other; and caulking for compressively pressing the thick part from an axial direction of the columnar body to plastically deform the thick part in a center direction of the mounting hole to bite the thick part into the circumferential groove of a shaft part opposed to the thick part.

Herein, preferably, the thick part of the mounting hole is formed by warm burring.

Preferably, the thick part is compressively pressed from the axial direction in warm state in the caulking step.

Preferably, the thick part is compressively pressed by a heated supporting tool and a heated pressure punch, the supporting tool having an inserting hole for sliding and guiding the shaft part, and abutting and supporting the thick part of the metal plate body to be set to the shaft part from one side of the axial direction, and the pressure punch pressing the thick part directly or indirectly from the other direction of the axial direction.

Also, the present invention provides a method for manufacturing an assembly of a resin molded body made of a thermoplastic resin with a hollow or solid columnar body made of a material having a higher melting point than that of the thermoplastic resin, comprising the steps of:

forming a through or bottomed mounting hole for inserting and assembling the columnar body in the resin molded body;

forming a circumferential groove with a predetermined depth at an assembled position of an outer circumferential surface of the columnar body inserted into the mounting hole;

inserting the columnar body into the mounting hole of the resin molded body and setting the columnar body to the assembled position where an inner circumferential surface of the mounting hole and the circumferential groove of the columnar body are opposed to each other; and applying compressive force to the circumferential part of the mounting hole of the resin molded body from the axial direction, applying supersonic vibration from a surface to be compressed, and making a material melted by supersonic vibration heat and located at the circumferential part of the mounting hole flow into the circumferential groove of the columnar body by the compressive force to fix the columnar body to the mounting hole of the resin molded body.

Herein, preferably, the circumferential part of the mounting hole is compressed in the axial direction by a supporting tool and a pressure tool, the supporting tool having an inserting hole for sliding and guiding the columnar body, and abutting and supporting the circumferential part of the mounting hole of the resin molded body set to the columnar body from one side of the axial direction, and the pressure tool pressing the circumferential part of the mounting hole from the other direction of the axial direction, and supersonic vibration is applied from the compressed surface, abutting on the circumferential part of the mounting hole in at least one or both of the supporting tool and pressure tool.

More specifically, a supporting surface which supports an outer surface of the resin molded body and an embedded part which is projected from the supporting surface and is embedded in the resin molded body are provided on the compressed surface applying the supersonic vibration; a material pushed aside by the embedded part is moved toward an inside of the mounting hole by applying the supersonic vibration and the compressive force; and a material located at the circumferential part of the mounting hole is press-fitted into the circumferential groove.

Also, the present invention provides an apparatus for manufacturing a caulked assembly of a metal plate body with a hollow or solid columnar body, the apparatus comprising:

means for forming a mounting hole for inserting and assembling the columnar body in the metal plate body and forming a thick part along an inner circumferential edge of the mounting hole;

means for forming a circumferential groove with a predetermined depth at an assembled position of an outer circumferential surface of the columnar body inserted into the mounting hole;

means for inserting the columnar body into the mounting hole of the metal plate body and setting the columnar body to the assembled position where the thick part and the circumferential groove are opposed to each other; and caulking means for compressively pressing the thick part from an axial direction of the columnar body to plastically deform the thick part in a center direction of the mounting hole to bite the thick part into the circumferential groove of the columnar body opposed to the thick part.

Herein, preferably, the thick part of the mounting hole is formed by burring. Also, preferably, the thick part is compressively pressed by a supporting tool and a pressure punch, the supporting tool having an inserting hole for sliding and guiding the columnar body, and abutting and supporting the thick part of the metal plate body to be set to the columnar body from one side of the axial direction, and the pressure punch pressing the thick part directly or indirectly from the other direction of the axial direction.

Also, the present invention provides an apparatus for manufacturing a caulked assembly of a metal plate body with a hollow or solid columnar body, the apparatus comprising:

means for forming a mounting hole for inserting and assembling the columnar body in the metal plate body by burring and forming a thick part composed of a cylindrical flange by barring along an inner circumferential edge of the mounting hole;

means for forming a circumferential groove with a predetermined depth at an assembled position of an outer circumferential surface of the columnar body inserted into the mounting hole;

means for inserting the columnar body into the mounting hole of the metal plate body to set the columnar body to the assembled position where the thick part and the circumferential groove are opposed to each other; and caulking means for compressively pressing the thick part from an axial direction to pressurize the cylindrical flange to make the surface of the thick part approximately flush with that of the metal plate body, forming a ring-shaped swollen flange along the outer circumferential surface of the columnar body on a surface opposite to a surface on which the cylindrical flange is projected, and simultaneously, plastically deforming the swollen flange in a center direction of the mounting hole to bite the swollen flange into the circumferential groove of the columnar body opposed to the swollen flange.

Herein, preferably, the thick part is compressively pressed from the axial direction by a supporting tool and a pressure punch, the supporting tool having an inserting hole for sliding and guiding the columnar body, having a notch groove for forming the swollen flange on an opening edge part of the inserting hole, and abutting and supporting a surface opposite to a surface on which a cylindrical flange of the metal plate body to be set to the columnar body is projected, and the pressure punch pressing the thick part directly or indirectly from the side on which the cylindrical flange is projected.

Also, the present invention provides an apparatus for manufacturing a caulked assembly of a metal plate body made of magnesium or a magnesium alloy with a hollow or solid columnar body, the apparatus comprising:

means for forming a mounting hole for inserting and assembling the columnar body into the plate body and forming a thick part along an inner circumferential edge of the mounting hole by warm pressing;

means for forming a circumferential groove with a predetermined depth at an assembled position of an outer circumferential surface of the columnar body inserted into the mounting hole;

means for inserting the columnar body into the mounting hole of the plate body and setting the columnar body to the assembled position where the thick part and the circumferential groove are opposed to each other; and caulking means for compressively pressing the thick part from an axial direction of the columnar body to plastically deform the thick part in a center direction of the mounting hole to bite the thick part into the circumferential groove of a shaft part opposed to the thick part.

Herein, preferably, the thick part of the mounting hole is formed by warm burring. Preferably, the caulking means compressively presses the thick part in warm state from the axial direction.

Specifically, preferably, the thick part is compressively pressed by a heated supporting tool and a heated pressure punch, the supporting tool having an inserting hole for sliding and guiding the shaft part, and abutting and supporting the thick part of the metal plate body to be set to the shaft part from one side of the axial direction, and the pressure punch pressing the thick part directly or indirectly from the other direction of the axial direction.

Also, the present invention provides a manufacturing apparatus used for the manufacturing method thereof, comprising:

pressing means for applying compressive force to a circumferential part of a mounting hole of the resin molded body from an axial direction in a state where the columnar body is inserted into the mounting hole of the resin molded body and the columnar body is set to an assembled position where an inner circumferential surface of the mounting hole and the circumferential groove of the columnar body are opposed to each other; and ultrasonic applying means for applying supersonic vibration from a surface to be compressed, wherein the columnar body is fixed to the mounting hole of the resin molded body by making a material melted by supersonic vibration heat and located at the circumferential part of the mounting hole flow into the circumferential groove of the columnar body by the compressive force.

More preferably, the manufacturing apparatus comprises:

means for forming a through or bottomed mounting hole for inserting and assembling the columnar body in the resin molded body;

means for forming a circumferential groove with a predetermined depth at an assembled position of an outer circumferential surface of the columnar body inserted into the mounting hole;

means for inserting the columnar body into the mounting hole of the resin molded body and setting the columnar body to the assembled position where an inner circumferential surface of the mounting hole and the circumferential groove of the columnar body are opposed to each other;

pressing means for applying compressive force to the circumferential part of the mounting hole of the resin molded body from the axial direction; and ultrasonic applying means for applying supersonic vibration from a surface to be compressed, wherein the columnar body is fixed to the mounting hole of the resin molded body by making a material melted by supersonic vibration heat and located at the circumferential part of the mounting hole flow into the circumferential groove of the columnar body by the compressive force.

Herein, preferably, the pressing means comprises:

a supporting tool; and a pressure tool, the supporting tool having an inserting hole for sliding and guiding the columnar body, and abutting and supporting the circumferential part of the mounting hole of the resin molded body set to the columnar body from one side of the axial direction;

the pressure tool pressing the circumferential part of the mounting hole from the other direction of the axial direction; and the circumferential part of the mounting hole is compressed in the axial direction.

Also, the ultrasonic applying means can apply supersonic vibration from the compressed surface, abutting on the circumferential part of the mounting hole in at least one of both of the supporting tool and pressure tool.

Furthermore, the manufacturing apparatus may comprise:

a supporting surface which supports an outer surface of the resin molded body; and an embedded part which is projected from the supporting surface and is embedded in the resin molded body, the supporting surface and embedded part are provided on the compressed surface applying the supersonic vibration, wherein a material pushed aside by the embedded part is moved toward an inside of the mounting hole by applying the supersonic vibration and the compressive force using the pressing means and the ultrasonic applying means, and a material located at the circumferential part of the mounting hole is press-fitted into the circumferential groove.

The present invention provides a caulked assembly comprising:

a metal plate body; and a hollow or solid columnar body, the metal plate body including:

a mounting hole for inserting and assembling the columnar body; and a thick part formed along an inner circumferential edge of the mounting hole, the columnar body including:

a circumferential groove with a predetermined depth, formed at an assembled position of an outer circumferential surface of the columnar body inserted into the mounting hole, wherein the columnar body is inserted into the mounting hole of the metal plate body; and the thick part is compressively pressed from the axial direction in a state where the thick part and the circumferential groove are set to the assembled position where the thick part and the circumferential groove are opposed to each other to plastically deform the thick part in the center direction of the mounting hole to bite and fix the thick part into the circumferential groove of the columnar body opposed to the thick part.

Also, the present invention provides a caulked assembly comprising:

a metal plate body; and a hollow or solid columnar body, the metal plate body including:

a mounting hole for inserting and assembling the columnar body by burring; and a thick part composed of a cylindrical flange by barring along an inner circumferential edge of the mounting hole, the columnar body including:

a circumferential groove with a predetermined depth, formed at an assembled position of an outer circumferential surface of the columnar body inserted into the mounting hole, wherein the columnar body is inserted into the mounting hole of the metal plate body; the thick part is compressively pressed from the axial direction to pressurize the cylindrical flange to make the surface of the thick part approximately flush with that of the metal plate body in a state where the thick part and the circumferential groove are set to an assembled position where the thick part and the circumferential groove are opposed to each other; and a ring-shaped swollen flange along the outer circumferential surface of the columnar body is formed on a surface opposite to a surface on which the cylindrical flange is projected; and simultaneously, the swollen flange is plastically deformed in a center direction of the mounting hole to bite the swollen flange into the circumferential groove of the columnar body opposed to the swollen flange.

Also, the present invention provides a caulked assembly comprising:

a metal plate body made of magnesium or a magnesium alloy; and a hollow or solid columnar body, the plate body including:

a mounting hole for inserting and assembling the columnar body; and a thick part formed along an inner circumferential edge of the mounting hole by warm pressing, the columnar body including:

a circumferential groove with a predetermined depth is formed at an assembled position of an outer circumferential surface of the columnar body inserted into the mounting hole, wherein the thick part is bitten and fixed into the circumferential groove of the shaft part opposed to the thick part by compressively pressing the thick part from an axial direction of the columnar body to plastically deform the thick part in a center direction of the mounting hole in a state where the columnar body is inserted into the mounting hole of the plate body and the columnar body is set to the assembled position where the thick part and the circumferential groove are opposed to each other. Particularly, the present invention also provides the caulked assembly, wherein the columnar body is made of magnesium or a magnesium alloy.

Also, the present invention provides an assembly comprising:

a resin molded body made of a thermoplastic resin; and a hollow or solid columnar body made of a material having a higher melting point than that of the thermoplastic resin, the resin molded body including:

a through or bottomed mounting hole for inserting and assembling the columnar body, the columnar body including:

a circumferential groove with a predetermined depth, formed at an assembled position of an outer circumferential surface of the columnar body inserted into the mounting hole, wherein compressive force is applied to a circumferential part of a mounting hole of the resin molded body from an axial direction in a state where the columnar body is inserted into the mounting hole of the resin molded body and the columnar body is set to an assembled position where an inner circumferential surface of the mounting hole and the circumferential groove of the columnar body are opposed to each other; supersonic vibration is applied from a surface to be compressed; and a material melted by supersonic vibration heat and located at the circumferential part of the mounting hole is made to flow into the circumferential groove of the columnar body by the compressive force to fix the columnar body to the mounting hole of the resin molded body.

According to embodiments of the present invention, the caulked assembly of the plate body with the columnar body is enabled at low cost in the easy pressing only by forming the circumferential groove on the columnar body easily and providing the thick part easily formed around the mounting hole of the plate body without providing the flange part at the middle part of the columnar body and producing the complicated specific shape. Since the thick part of the plate body is formed, and the thick part is plastically deformed and bitten into the circumferential groove, the sufficient caulking strength is obtained, and the strength of the plate body itself is also simultaneously obtained. Thereby, even if the plate body has a thinner thickness than that of conventional one, the same high caulking strength as that of the conventional one can be obtained. Thus, the cost reduction of 20 to 70% of that of the conventional one can be attained by simplifying the shape of the shaft.

According to embodiments of the present invention, the caulked assembly of the plate body with the columnar body is enabled at low cost in the easy pressing only by forming the circumferential groove on the columnar body easily and providing the thick part easily formed around the mounting hole of the plate body, the thick part composed of the cylindrical flange by the barring without providing the flange part at the middle part of the columnar body and producing the complicated specific shape. Since the thick part composed of the cylindrical flange by the barring is formed on the plate body, and the thick part is plastically deformed and bitten into the circumferential groove, the sufficient caulking strength is obtained. Simultaneously, the ring-shaped swollen flange along the outer circumferential surface of the columnar body is formed on the surface opposite to the surface on which the cylindrical flange is projected, and the strength of the plate body itself is also obtained. Thereby, even if the plate body has a thinner thickness than that of the conventional one, the same high caulking strength as that of the conventional one can be obtained. Thus, the cost reduction of 20 to 70% of that of the conventional one can be attained by simplifying the shape of the shaft. Although the cylindrical flange can be also bitten and fixed into circumferential groove while the cylindrical flange is partially left without providing the swollen flange, the cylindrical flange is formed by burring, and the projected end surface has knurling and unevenness caused by the processing. When the cylindrical flange is brought into contact with the other parts such as a gear, the projected end surface damages the other parts. In addition, coating or the like does not exist on the projected end surface by the barring even when a usual corrosion prevention coating is applied onto the surface of the metal plate body, which causes corrosion. On the other hand, in the present invention, the surface of the cylindrical flange is made approximately flush with the surface of the metal plate body by pressurizing the cylindrical flange to solve the above problem, and the ring-shaped swollen flange along the outer circumferential surface of the columnar body is formed on the surface opposite to the surface on which the cylindrical flange is projected. The swollen flange is prepared by plastically deforming the metal plate body by compression pressing. The projected end surface thereof has no unevenness or the like and causes no problem even when the other parts are brought into slide contact with the projected end surface. The projected end surface is the swollen surface of an original plate body. When the coating or the like is applied onto the surface thereof, the coating exists as it is, and can prevents the corrosion effectively.

According to embodiments of the present invention, the caulked assembly of the plate body with the columnar body, the plate body and columnar body made of magnesium or the magnesium alloy having worse processability, is enabled at low cost in the easy pressing only by forming the circumferential groove on the columnar body easily and providing the thick part formed by the warm pressing around the mounting hole of the plate body without providing the flange part at the middle part of the columnar body and producing the complicated specific shape. Since the thick part of the plate body is formed, and the thick part is plastically deformed and bitten into the circumferential groove, the sufficient caulking strength is obtained, and the strength of the plate body itself is also simultaneously obtained. Thereby, even if plate body has a thinner thickness than that of conventional one, the same high caulking strength as that of the conventional one can be obtained. Thus, the cost reduction can be largely attained by simplifying the shape of the shaft. Since the thick part can be perfectly formed without causing crack and fracture or the like by the warm pressing, the thick part can be finely bitten into the circumferential groove, and the formation of the thick part by the warm pressing is an important element in the present invention relating to the caulking of the magnesium or magnesium alloy material. If the thick part has the crack and the fracture or the like, the caulked part has insufficient strength.

According to embodiments of the present invention, the compressive force is applied to the circumferential part of the mounting hole of the resin molded body from the axial direction. In addition, the supersonic vibration is applied from the compressed surface, and the material melted by the supersonic vibration heat and located at the circumferential part of the mounting hole is made to flow into the circumferential groove of the columnar body by the compressive force to fix the columnar body to the mounting hole of the resin molded body. The firm junction can be realized compared with the conventional mere press fitting and the adhesion due to the solvent. In addition, if only the thickness required for flowing into the circumferential groove can be secured, the junction strength can be maintained even if the thickness of a resin molded plate is reduced, which can sufficiently correspond also to the reduction in the thickness of the precision component in recent years. The conventional mere press fitting method has an extraction force of about 30N. By contrast, the assembly of the present invention having the same material and size has a confirmed extraction force of 100N or more. Also, this method, which is an easy method for compressing the circumferential part of the mounting hole of the resin molded body in the axial direction, can maintain the caulked accuracy such as the perpendicular degree of the columnar body, and does not require a device having a complicated structure. In addition, the method can comparatively freely provide the shape of the caulked members by only providing the circumferential groove on the columnar body, assemble the resin molded body and the columnar body at low cost and at a short time, and correspond without problems as the fixing method for the precision components.

BRIEF DESCRIPTION OF THE DRAWINGS

FIG. 40(*b*) shows a test method for falling strength; and FIG. 40(*c*) shows a test method for rotating strength.

DESCRIPTION OF THE SYMBOLS

| | |
|---|---|
| 1: | caulked assembly |
| 2: | plate body |
| 2A: | resin molded body |
| 3: | columnar body |
| 4: | caulking tool |
| 4A: | pressing means |
| 5: | spacer member |
| 6: | base |
| 6A: | compressed surface |
| 7: | burring apparatus |
| 7A: | compressed surface |
| 8: | ultrasonic applying means |
| 9: | spacer member |
| 20: | mounting hole |
| 21: | thick part |
| 21A: | circumferential part of mounting hole |
| 22: | cylindrical flange |
| 23: | swollen flange |
| 30: | circumferential groove |
| 31: | flange part |
| 32: | knurling groove |
| 40: | inserting hole |
| 41: | supporting tool |
| 42: | outer shape holding tool |
| 43: | pressure punch |
| 43A: | pressure tool |
| 44: | notch groove |
| 45: | supporting base |
| 46: | elastic supporting tool |
| 47: | heating base |
| 48, 49: | heating means |
| 50: | lower end part |
| 60: | hole |
| 61: | base |
| 62: | supporting plate |
| 70: | pressure punch |
| 71: | stripper |
| 72: | supporting die |
| 73, 74: | heating means |
| 80: | supporting surface |
| 81: | embedded part |
| 90: | supporting surface |
| 91: | embedded part |
| H: | distance |
| h: | flange height |
| S: | space |

DETAILED DESCRIPTION OF THE PREFERRED EMBODIMENT

Next, embodiments of the present invention will be described in detail with reference to the accompanying drawings.

Figure 1:
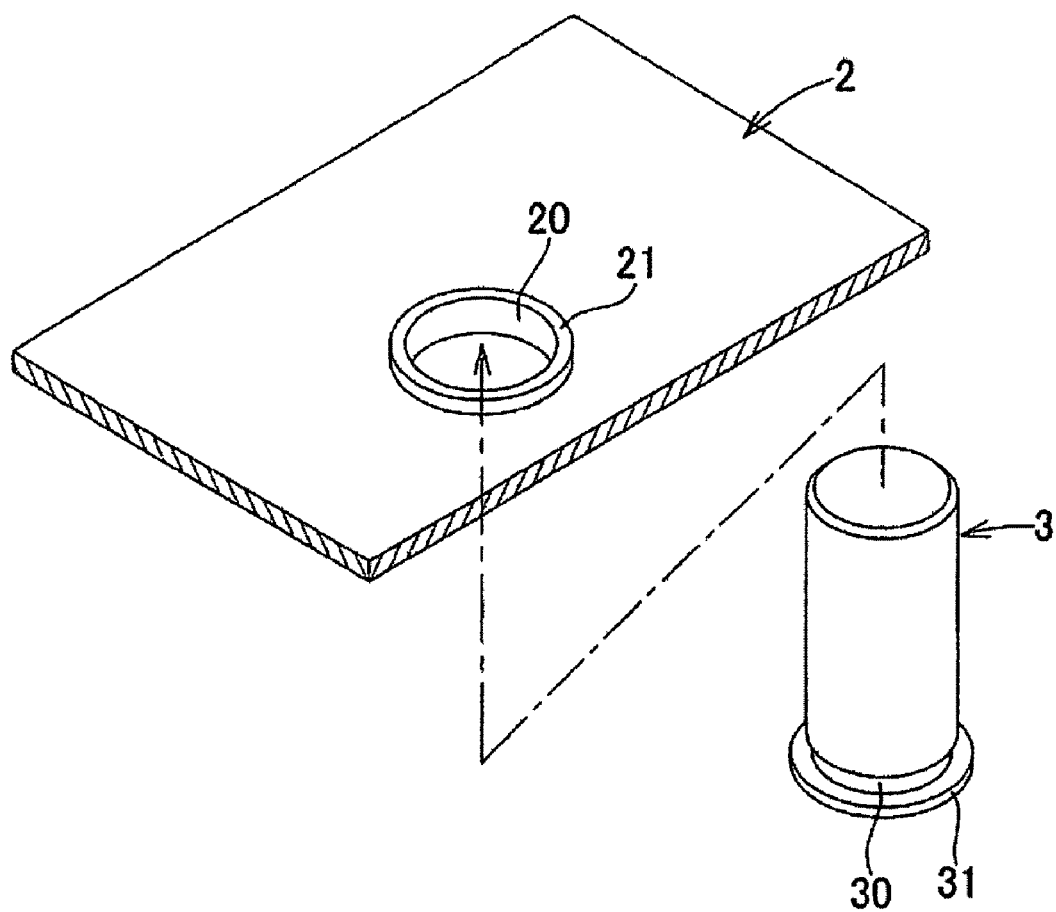
FIG. 1 is a perspective view showing members of a caulked assembly according to a first embodiment of the present invention.
Figure 5:
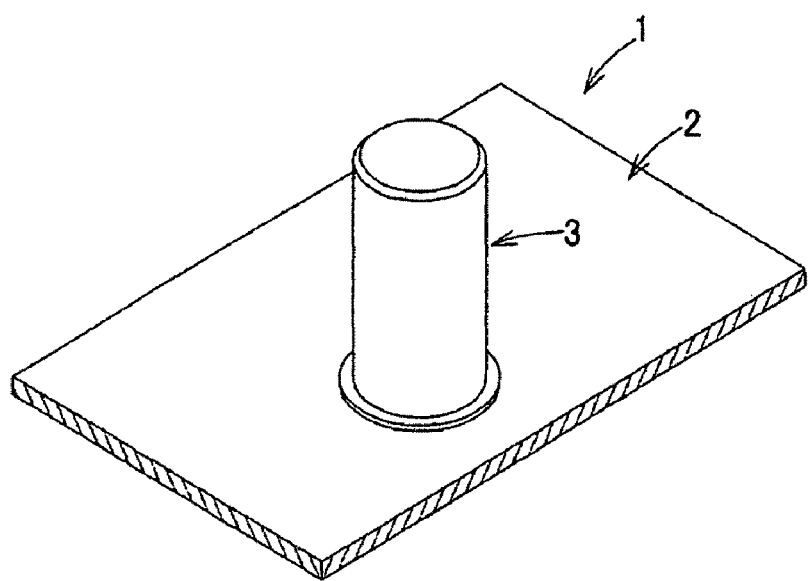
FIG. 5 is a perspective view showing the caulked assembly of the first embodiment.
Figure 6:
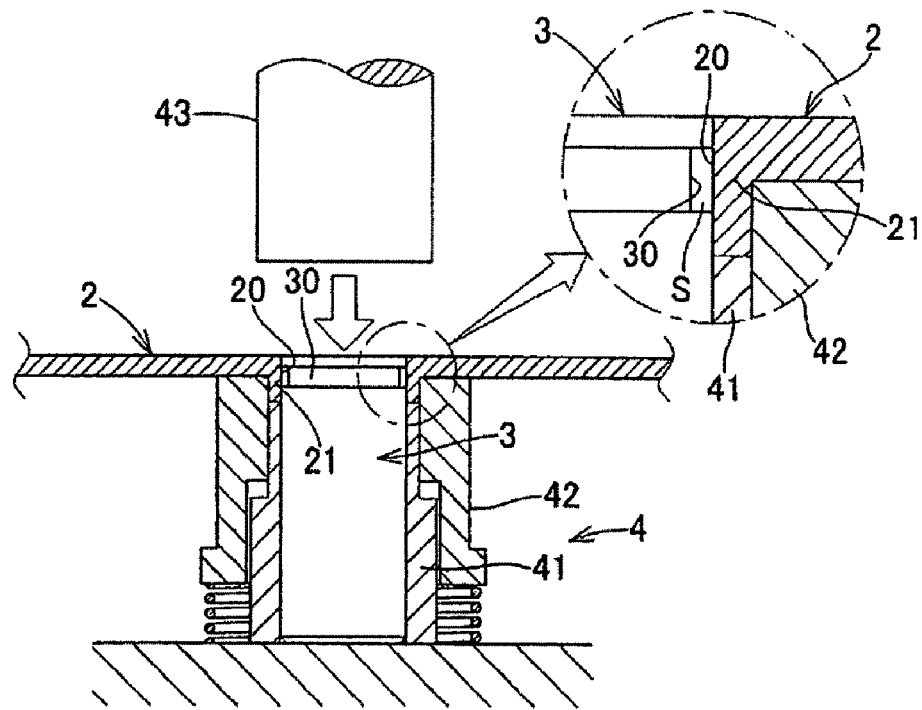
FIG. 6(a) is a sectional view showing a manufacturing method of a second embodiment.
FIG. 6(b) is a sectional view showing the manufacturing method of the second embodiment.
Figure 6:
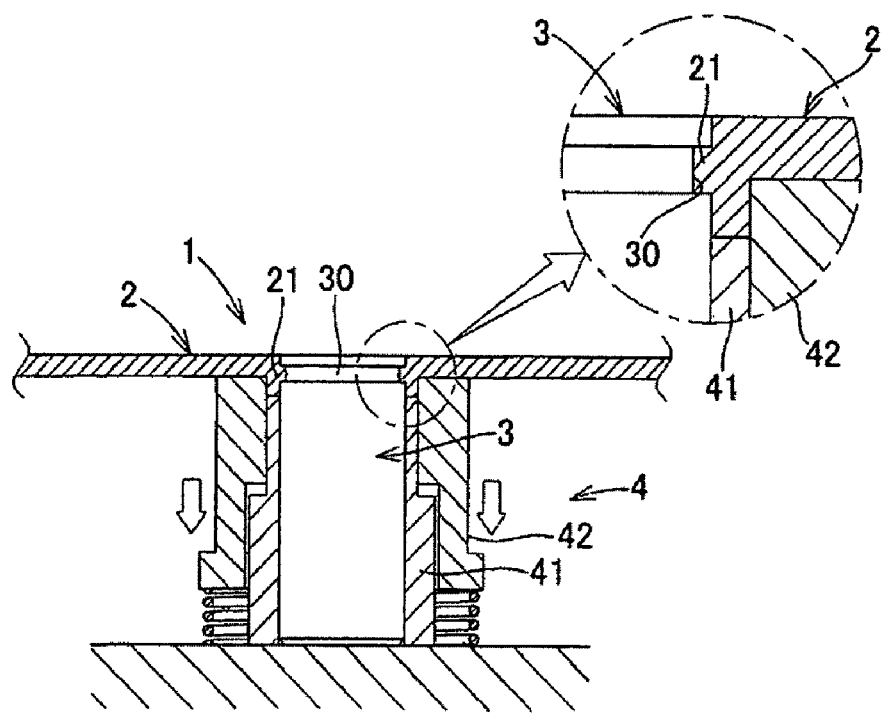
Figure 7:
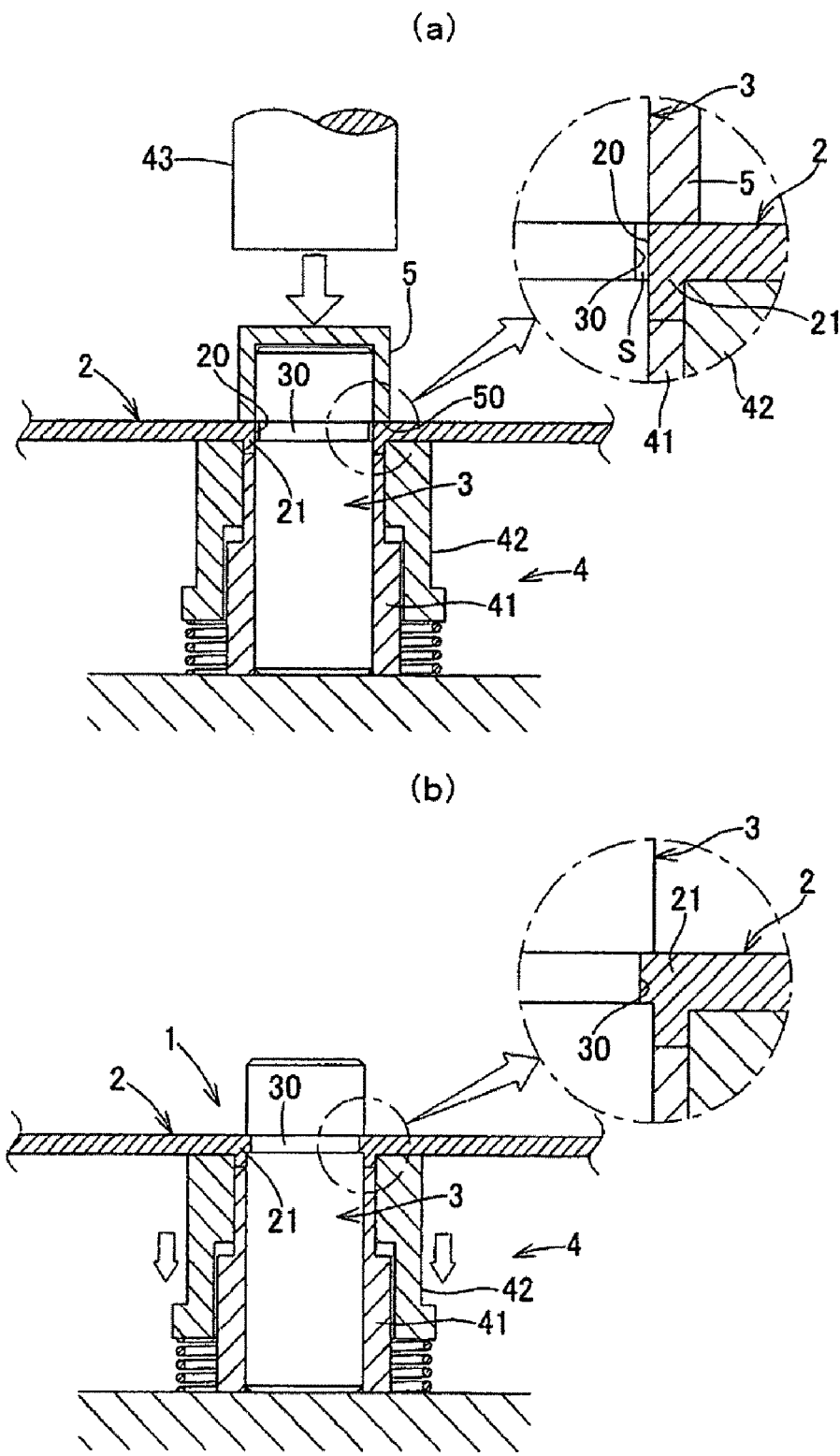
FIG. 7(a) is a sectional view showing a manufacturing method of a third embodiment.
FIG. 7(b) is a sectional view showing the manufacturing method of the third embodiment.

FIG. 1 shows a metal plate body 2 and columnar body 3 used for a caulked assembly according to the present invention. FIGS. 1 to 5 show a first embodiment of a manufacturing method. FIG. 6 shows a second embodiment thereof. FIG. 7 shows a third embodiment thereof. In the figures, reference numeral 1 designates a caulked assembly; reference numeral 2, a plate body; and reference numeral 3, a columnar body.

First, the manufacturing method of the first embodiment will be described with reference to FIGS. 1 to 5.

As shown in FIG. 1, the caulked assembly 1 according to the present invention is prepared by assembling the metal plate body 2 and hollow or solid columnar body 3 by caulking, and is particularly suitable for electronic components or the like. However, it is needless to say that the caulked assembly 1 can be applied to various parts and products.

In the plate body 2, a mounting hole 20 for inserting and assembling the columnar body 3 is formed. Along the inner circumferential edge of the mounting hole, a thick part 21 is formed. In the following description, a hole edge part is erected in one direction by burring to form the thick part 21. However, the hole edge part may be processed to the other shape.

The columnar body 3 has an outer circumferential surface on which a circumferential groove 30 with a predetermined depth is formed.

As described in the first to third embodiments, the columnar body 3 is inserted into the mounting hole 20 of the plate body 2, and the thick part 21 is compressively pressed from the axial direction in a state where the thick part 21 is opposed to the circumferential groove 30 to plastically deform the thick part 21 in the center direction of the hole. The thick part 21 is bitten and fixed into a space S in the circumferential groove 30.

Specifically, the caulked assembly 1 is processed using a manufacturing apparatus provided with a burring part, a groove processing means, a mounting means, and a caulking part. The burring part forms a mounting hole for inserting and assembling the columnar body 3 on the plate body 2 and forms a thick part by burring along the inner circumferential edge of the mounting hole. The groove processing means forms a circumferential groove with a predetermined depth at an assembled position of the outer circumferential surface of the columnar body inserted into the mounting hole. The mounting means inserts the columnar body 3 into the mounting hole 20 of the plate body 2 and sets the columnar body 3 to the assembled position where the thick part 21 is opposed to the circumferential groove 30. The caulking part compressively presses the thick part 21 from the axial direction to plastically deform the thick part 21 in the center direction of the mounting hole to be bitten into the circumferential groove of the columnar body opposed to the thick part.

Figure 2:
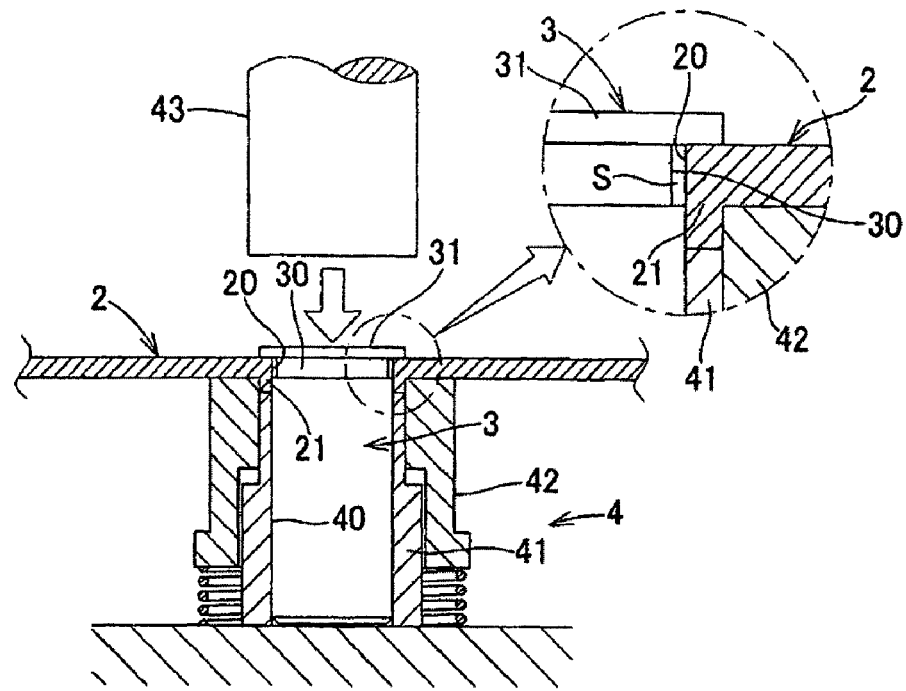
FIG. 2 is a sectional view showing a state where the members are attached to a caulking tool in the first embodiment.
Figure 3:
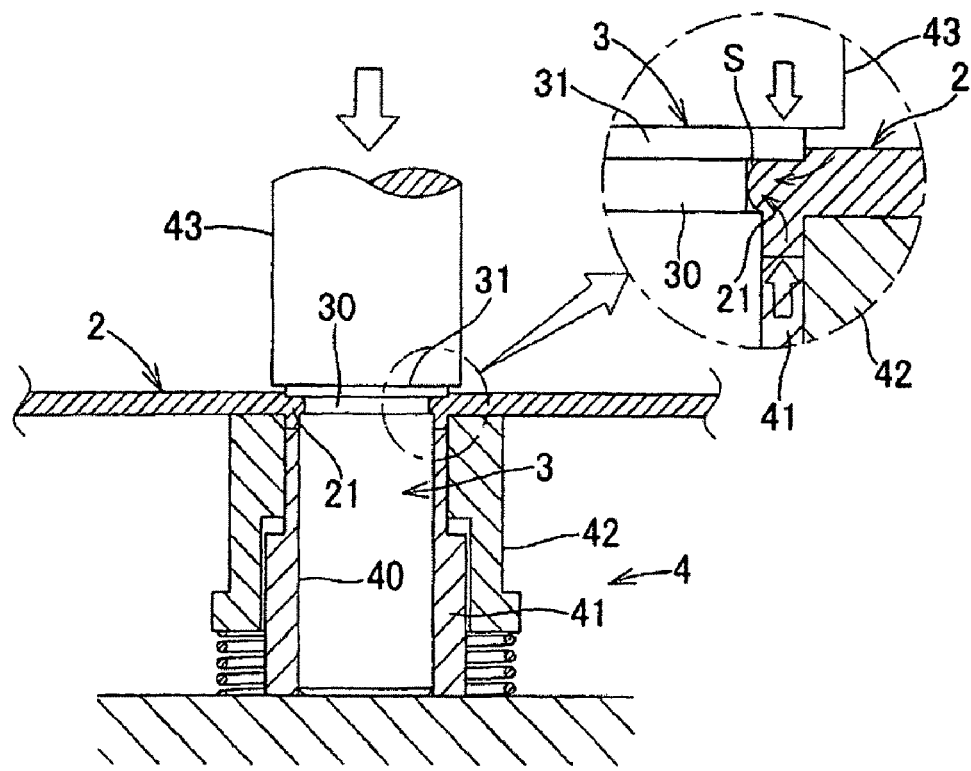
FIG. 3 is a sectional view showing a process in which a thick part is plastically deformed to be bitten into a circumferential groove of a columnar body.
Figure 4:
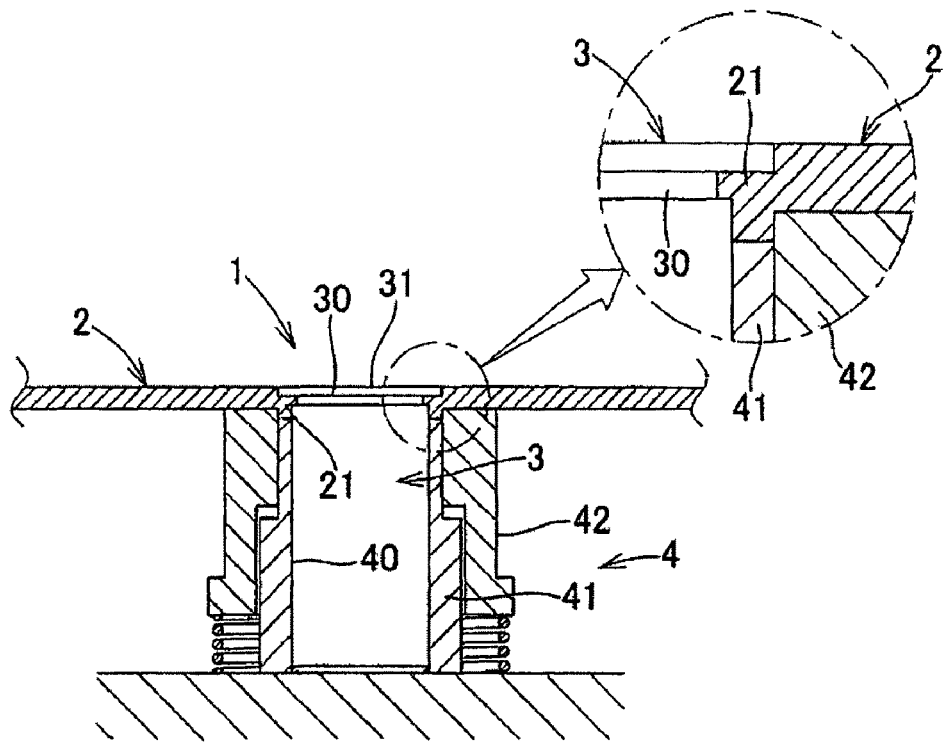
FIG. 4 is a sectional view showing a state where caulking is completed.

As shown in FIGS. 2 to 4, a caulked part has a receiving supporting tool 41, an outer shape holding tool 42 and a pressure punch 43. The receiving supporting tool 41 has an inserting hole 40 into which the columnar body 3 can be slid and guided, and abuts and supports the thick part 21 of the plate body 2 from the lower part. The outer shape holding tool 42 supports the plate body 2 while upwardly energizing the plate body 2 at the circumferential part of the mounting hole 20. The pressure punch 43 directly or indirectly presses the thick part 21 from the other side of the axial direction.

First, the mounting hole 20 for inserting and assembling the columnar body 3 is formed in the plate body 2. The thick part 21 is formed along the inner circumferential edge of the mounting hole 20. At least the mounting hole 20 opened in a plate portion and the thick part 21 thereof need only to exist on the plate body 2. A structure except that of the plate portion may exist on the other portion.

On the other hand, on the outer circumferential surface of the columnar body 3 inserted into the mounting hole 20, the circumferential groove 30 with a predetermined depth is formed at the assembled position where the plate body 2 will be attached. In this example, a flange part 31 is formed on the end part of the columnar body.

The depth of the circumferential groove 30 is suitably set according to sizes of the thickness of the plate body 2 and the outer diameter of the shaft or the like so that sufficient strength can be maintained in a state where the thick part 21 of the plate body 2 is bitten and fixed. At least the circumferential groove 30 formed on the outer circumferential surface needs only to exist on the columnar body 3, and a structure except the axial shape may exist on other portion.

Figure 8:
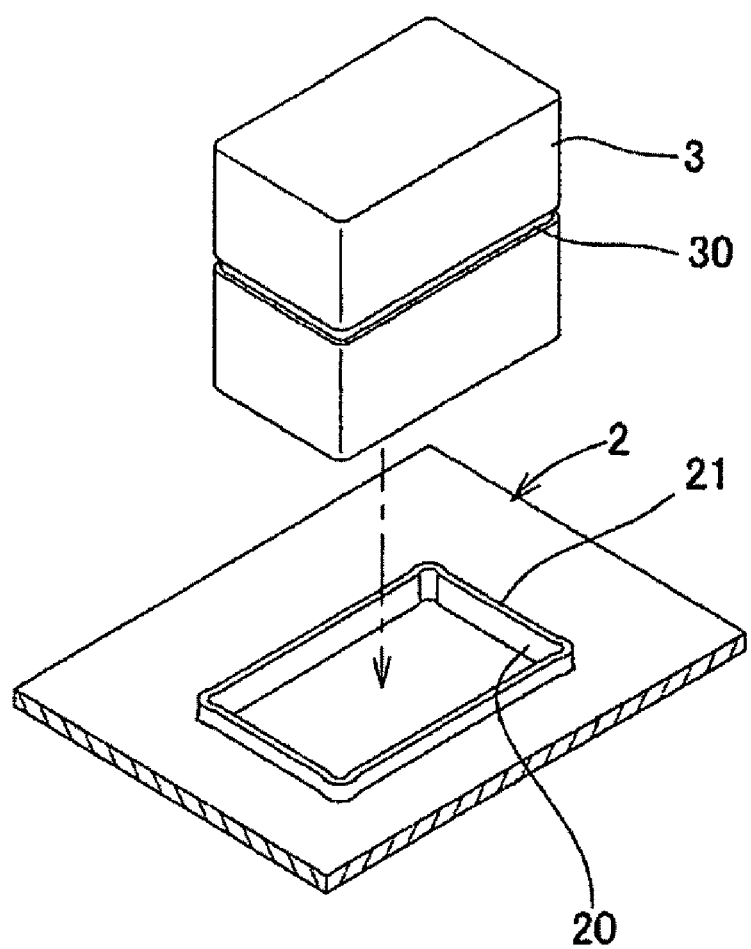
FIG. 8 shows a modification of each of members of a caulked assembly.

In this example, the mounting hole 20 of the plate body 2 on which the thick part 21 is formed is formed in a circular shape, and the columnar body has an outer circumferential surface having a circular shape in cross section for fitting the columnar body into the mounting hole 20. However, the present invention is not limited to such a shape at all. Even in the columnar body 3 having a different shape, circular arc shape or square shape or the like in cross section, as shown in FIG. 8, the plate body 2 can be assembled by forming the mounting hole 20 according to the shapes. Also, the columnar body 3 and the mounting hole 20 may not have the same shape. For example, it is preferable that the columnar body 3 has a polygonal shape in cross section, and the mounting hole 20 circumscribes to the columnar body 3. Also, it is preferable that the columnar body 3 has a circular shape in cross section and the mounting hole 20 has a polygon shape which circumscribes to the columnar body 3. The columnar body 3 may be solid. The columnar body 3 may be a cylindrical body such as a frame of a vehicle and pillar prepared by forming a thin plate in a cylindrical shape. In this case, the circumferential groove can be easily formed by pressing.

There is used the metal plate body 2 for plastically deforming the thick part 21. By contrast, various materials such as synthetic resins, ceramics, woods and compound fibers besides metals can be applied to the columnar body 3.

Next, as shown in FIG. 2, the plate body 2 is attached to a caulking tool 4. The caulking tool 4 includes a receiving supporting tool 41 and an outer shape holding tool 42. The receiving supporting tool 41 has the inserting hole 40 into which the columnar body 3 can be slid and guided, and abuts and supports the thick part 21 of the plate body 2 from the lower part. The outer shape holding tool 42 supports the plate body 2 while upwardly energizing the plate body 2 at the circumferential part of the mounting hole 20. The columnar body 3 is inserted into the mounting hole 20 of the plate body 2 and the inserting hole 40 of the receiving supporting tool 41 with a flange part 31 up. The flange part 31 is locked to the upper surface of the mounting hole 20. Thereby, the thick part 21 and the circumferential groove 30 are opposed to each other.

In this example, the thick part 21 formed by the burring is made downward, and the end part thereof is set so as to abut on the receiving supporting tool 41. However, the thick part 21 can be absolutely set so as to be made upward.

The pressure punch 43 is pushed to the plate body 2 and the columnar body 3 which are set to the caulking tool 4 from above. The thick part 21 is compressively pressed between the pressure punch 43 and the receiving supporting tool 41 via the flange part 31 of the columnar body 3. Thereby, as shown in FIG. 3, the thick part 21 is plastically deformed in the center direction of the mounting hole to be bitten into the space S in the circumferential groove 30 of the columnar body opposed to the thick part 21. Finally, as shown in FIGS. 4, 5, the circumferential groove 30 is filled with the plastically deformed thick part 21 to obtain the caulked assembly 1 prepared by firmly integrating the plate body 2 and the columnar body 3.

Next, a manufacturing method of a second embodiment will be described with reference to FIG. 6.

In the first embodiment, there was described the columnar body 3 having the flange part 31 which is projected from the outer diameter. However, in this embodiment, a method for assembling the columnar body 3 with the plate body 2 without having such a flange part will be described.

The flange part 31 projected from the outer diameter is not formed on the end part of the columnar body 3. As shown in FIG. 6(*a*), the end part of the columnar body 3 is made the same outer diameter as that of the other outer circumferential surface. The circumferential groove 30 is formed near the end part. The plate body 2 is the same as that of the above first embodiment. The columnar body 3 is set to a position where the upper end surface of the columnar body 3 is flush with the plate body 2 by the same caulking tool 4 as that of the first embodiment, and the circumferential groove 30 and the thick part 21 are opposed to each other.

The thick part 21 is directly compressively pressed between the pressure punch 43 and the receiving supporting tool 41 by pushing the pressure punch 43 from above. Thereby, as shown in FIG. 6(*b*), in the same manner as in the first embodiment, the space S in the circumferential groove 30 is filled with the plastically deformed thick part 21 to obtain the caulked assembly 1 prepared by firmly integrating the plate body 2 and the columnar body 3.

In this example, the columnar body 3 is also simultaneously compressed. However, preferably, the lower end of the columnar body is supported by spring energization as in the plate body 2, and thereby the columnar body can be downwardly moved together with the pressure punch 43 to prevent the compression of the columnar body 3. Also, in the same manner as in the following third embodiment, compressive pressing may be conducted via a spacer member having a lower end part abutting on the thick part 21, and a cylindrical part having only the thick part abutting on the lower end of the pressure punch 43 may be integrally formed. The material, structure and other modification or the like of the columnar body 3 and plate body 2 can be applied as in the first embodiment.

Next, a manufacturing method of a third embodiment will be described with reference to FIG. 7.

The example in which the plate body 2 was assembled with the end part of the columnar body 3 was described in the above first and second embodiments. In this embodiment, an example in which the plate body 2 is caulked with the middle part of the columnar body 3 will be described in place of the end part of the columnar body 3.

As shown in FIG. 7(*a*), the circumferential groove 30 is formed in the middle part in the axial direction of the columnar body 3, and the plate body 2 to be assembled with columnar body 3 is the same as that of the above first embodiment. The columnar body 3 is set to a position where the circumferential groove 30 and the thick part 21 are opposed to each other by the same caulking tool 4 as that of the first embodiment. In addition, a spacer member 5 provided with a cylindrical part having a lower end part 50 abutting on the upper end surface of the thick part 21 is separately adhered on a portion upwardly projected from the plate body 2 above the circumferential groove 30.

The thick part 21 is compressively pressed between the spacer member 5 and the receiving supporting tool 41 by pushing the spacer member 5 by the pressure punch 43 from above. Thereby, as in the first embodiment, as shown in FIG. 7(*b*), the space S in the circumferential groove 30 is filled with the plastically deformed thick part 21 to obtain the caulked assembly 1 prepared by firmly integrating the plate body 2 and the columnar body 3.

Herein, although the spacer member 5 is formed in a shape with a bottom opened downward, the spacer member 5 may be formed in a cylindrical shape opened upward. Although the columnar body 3 is also compressed together from the middle by the spacer member 5, the space between the spacer member 5 and the upper end surface of the columnar body 3 may be sufficiently formed to prevent compressive force from acting on the columnar body 3.

Furthermore, as in the plate body 2, preferably, the lower end of the columnar body is supported by spring energization, and thereby the columnar body can be downwardly moved together with the spacer member 5 to prevent the compression of the columnar body. Although the spacer member 5 is separately interposed between the pressure punch 43 and the thick part 21 in this example, it is preferable that the same cylindrical part as the spacer member 5 is integrally formed with the lower end part of the pressure punch 43. The material, structure and other modification or the like of the columnar body 3 and plate body 2 can be applied as in the first embodiment.

Next, a manufacturing method of a fourth embodiment will be described with reference to FIG. 9.

Figure 9:
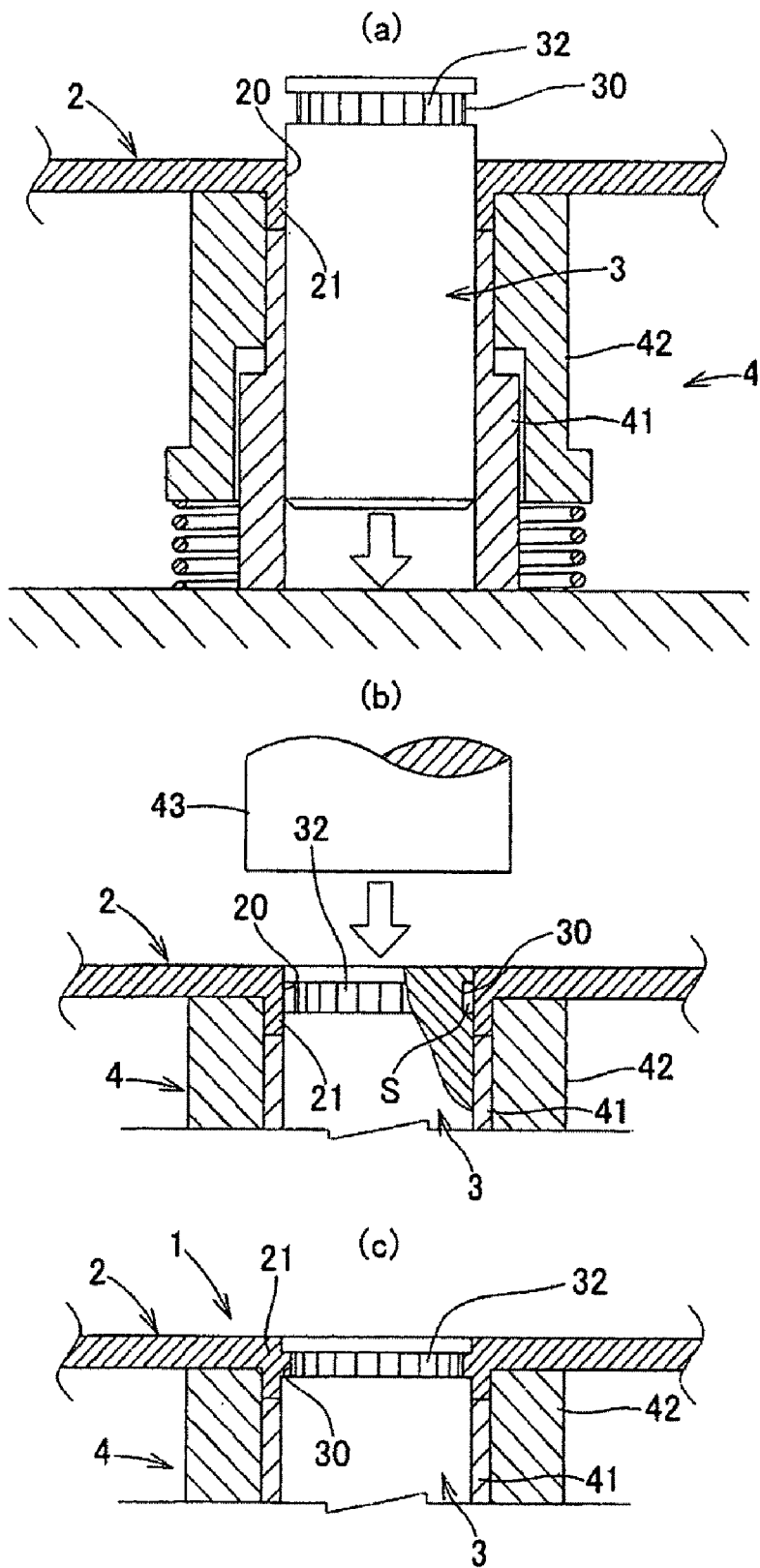
FIG. 9(a) is a sectional view showing a manufacturing method of a fourth embodiment.
FIG. 9(b) is a sectional view showing the manufacturing method of the fourth embodiment.
FIG. 9(c) is a sectional view showing the manufacturing method of the fourth embodiment.

In this embodiment, as shown in FIG. 9, uneven grooves (knurling groove 32 according to knurling in this example) are formed over the whole circumference of the circumferential groove 30 formed on the outer circumferential surface of the columnar body 3 by uneven working. When the thick part 21 of the plate body 2 is bitten and fixed into the space S in the circumferential groove 30, the caulking strength is further enhanced by bitting the thick part 21 into the uneven groove. In this example, the uneven grooves may be formed on the bottom part of the circumferential groove 30 or may be formed on the side wall of the circumferential groove. The uneven grooves may be formed on both the bottom part and side wall of the circumferential groove. Furthermore, it is not necessary to form the uneven grooves on the whole surface of the bottom part or inner side wall. The uneven grooves may be partially formed along the axial direction (groove width direction) of the bottom surface of the circumferential groove, or may be partially formed along the diameter direction (groove depth direction) of the inner side wall. Referring to these uneven grooves, the rotating strength can be further enhanced by forming the groove extending in the direction of crossing the circumferential direction, particularly a plurality of grooves extending in the axial direction at intervals. Although the uneven working which forms these uneven grooves is preferably carried out by knurling in this example, of course, the uneven grooves can be also formed by the other uneven working. The uneven grooves are also preferably formed in an oblique direction (spirally) and in a knitted loop shape in addition to the formation of the uneven grooves along the axial direction of this example. The material, structure, processing method and other modification or the like of the columnar body 3 and plate body 2 can be applied as in the first to third embodiments.

Next, a manufacturing method of a fifth embodiment will be described with reference to FIGS. 10 to 14.

Figure 10:
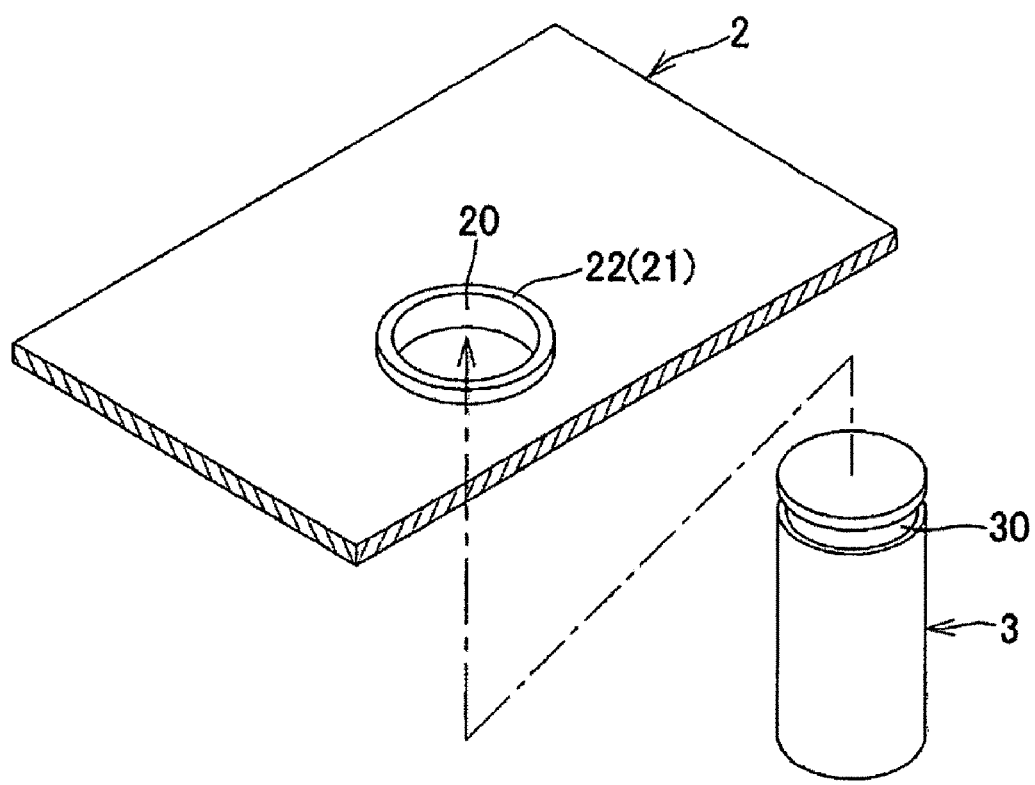
FIG. 10 is a perspective view showing members of a caulked assembly according to a fifth embodiment of the present invention.
Figure 14:
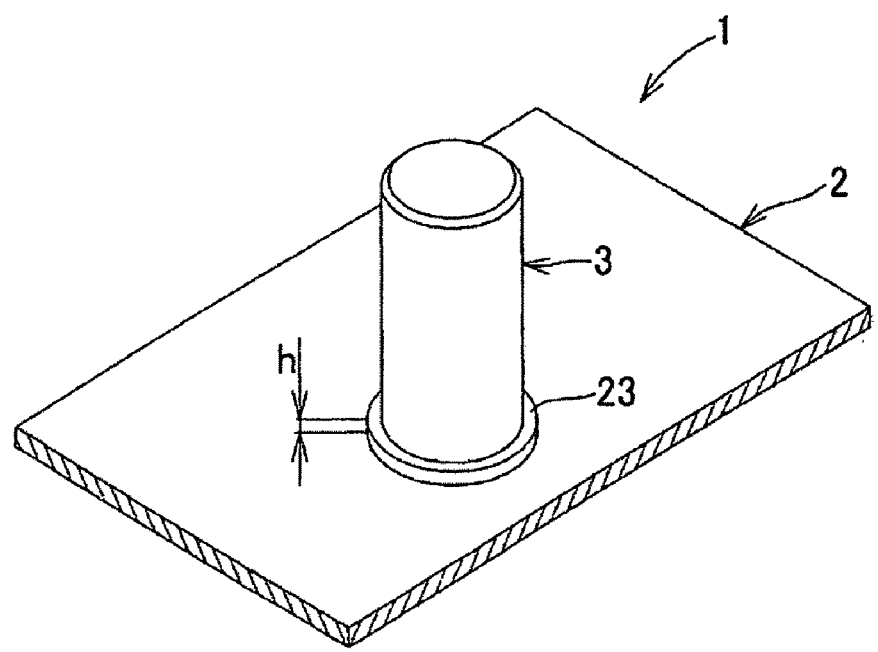
FIG. 14 is a perspective view showing the caulked assembly of the fifth embodiment.
Figure 15:
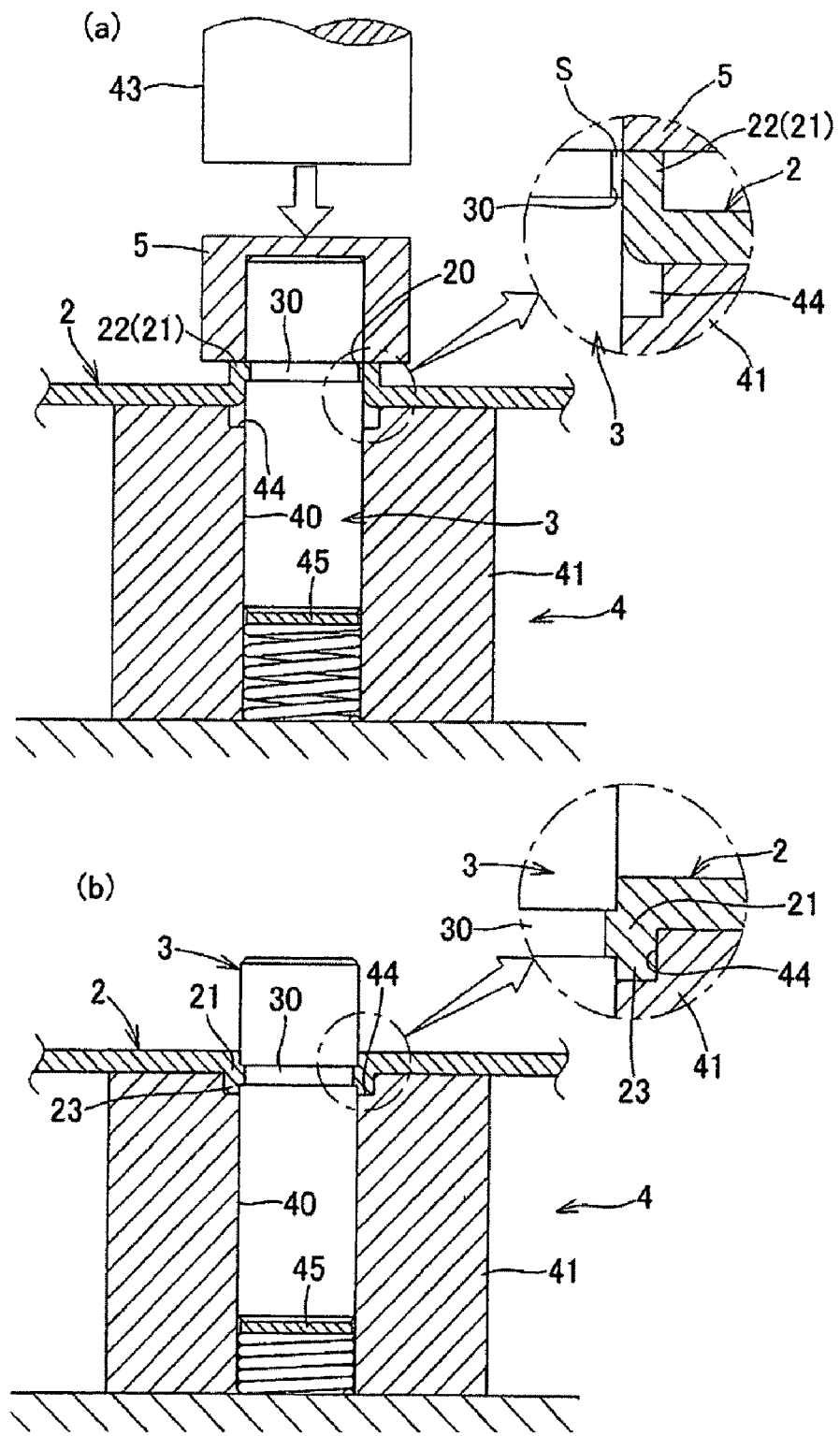
FIG. 15(a) is a sectional view showing a manufacturing method of a sixth embodiment.
FIG. 15(b) is a sectional view showing the manufacturing method of the sixth embodiment.

FIG. 10 shows a metal plate body 2 and columnar body 3 used for a caulked assembly according to the present invention. FIGS. 10 to 14 show a fifth embodiment of a manufacturing method. FIG. 15 shows a sixth embodiment thereof. In the figures, reference numeral 1 designates a caulked assembly; reference numeral 2, a plate body; and reference numeral 3, a columnar body.

As shown in FIG. 10, the caulked assembly 1 according to the present invention is prepared by assembling the metal plate body 2 and hollow or solid columnar body 3 by caulking, and is particularly suitable for electronic components or the like. However, it is needless to say that the caulked assembly 1 can be applied to various parts and products.

In the plate body 2, a mounting hole 20 for inserting and assembling the columnar body 3 is formed by burring, and along the inner circumferential edge of the mounting hole, a thick part 21 formed of a cylindrical flange 22 by burring is formed along the inner circumferential edge of the mounting hole. The columnar body 3 has an outer circumferential surface on which a circumferential groove 30 with a predetermined depth is formed.

As described in the fifth and sixth embodiments, a cylindrical flange 22 is pressurized by inserting the columnar body 3 into the mounting hole 20 of the plate body 2 and compressively pressing the thick part 21 from the axial direction in a state where the thick part 21 and the circumferential groove 30 are opposed to each other, and the cylindrical flange 22 is approximately flush with the surface of the plate body 2. In addition, a ring-shaped swollen flange 23 is formed along the outer circumferential surface of the columnar body 3 on a surface of the opposite side of the surface on which the cylindrical flange 22 was projected. Simultaneously, the thick part 21 is plastically deformed in the center direction of the mounting hole, and is then bitten and fixed into the space S in the circumferential groove 30.

Specifically, the caulked assembly 1 is processed using a manufacturing apparatus provided with a burring part, a groove processing means, a mounting means, and a caulking part. The burring part forms a mounting hole for inserting and assembling the columnar body 3 on the plate body 2 and forms the thick part composed of the cylindrical flange 22 by burring along the inner circumferential edge of the mounting hole. The groove processing means forms a circumferential groove with a predetermined depth at an assembled position of the outer circumferential surface of the columnar body inserted into the mounting hole. The mounting means inserts the columnar body 3 into the mounting hole 20 of the plate body 2 and sets the columnar body 3 to the assembled position where the thick part 21 is opposed to the circumferential groove 30. The caulking part compressively presses the thick part 21 from the axial direction to pressurize the cylindrical flange 22 to make the surface of the thick part 21 approximately flush with that of the plate body 2, forms the ring-shaped swollen flange 23 along the outer circumferential surface of the columnar body on a surface of the opposite side, and simultaneously, plastically deforms the swollen flange in the center direction of the mounting hole to bit the swollen flange into the circumferential groove of the columnar body opposed to the swollen flange.

Figure 11:
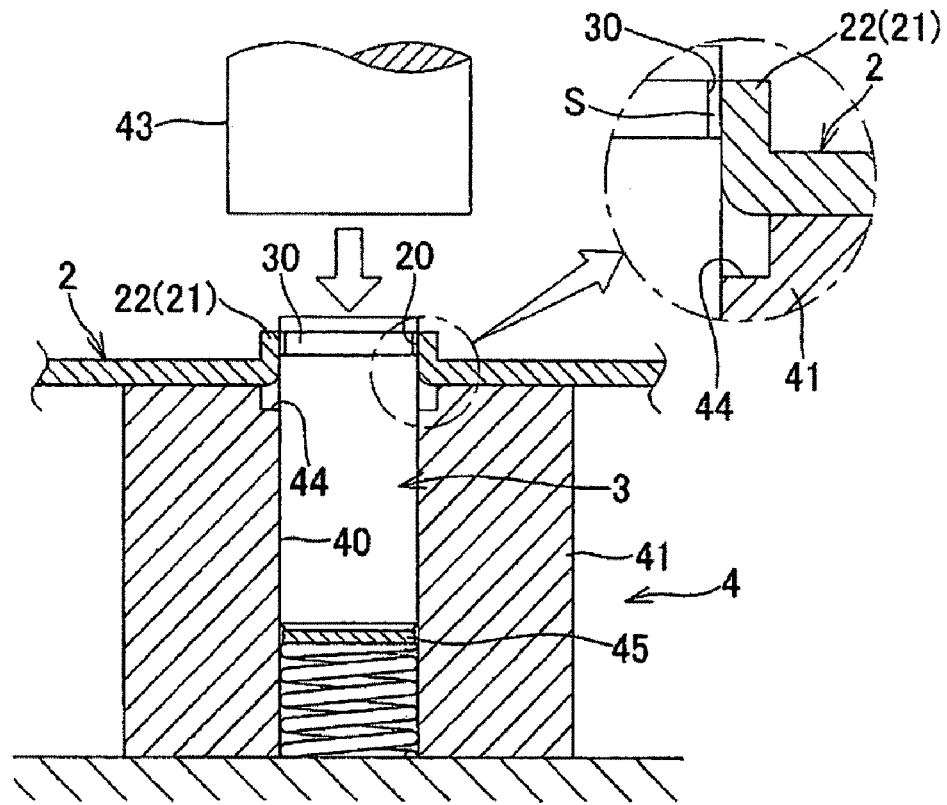
FIG. 11 is a sectional view showing a state where members are attached to a caulking tool in the fifth embodiment.
Figure 12:
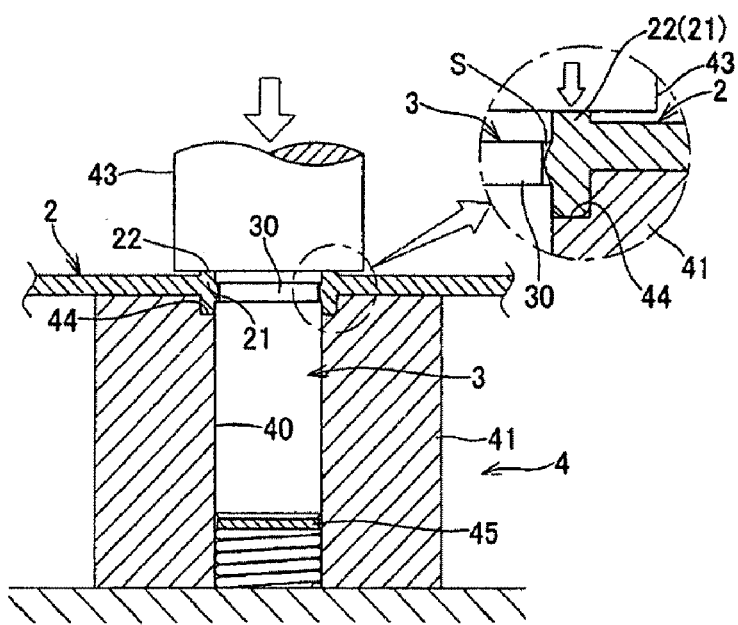
FIG. 12 is a sectional view showing a process in which a thick part is plastically deformed to be bitten into a circumferential groove of a columnar body and a notch groove of a tool.
Figure 13:
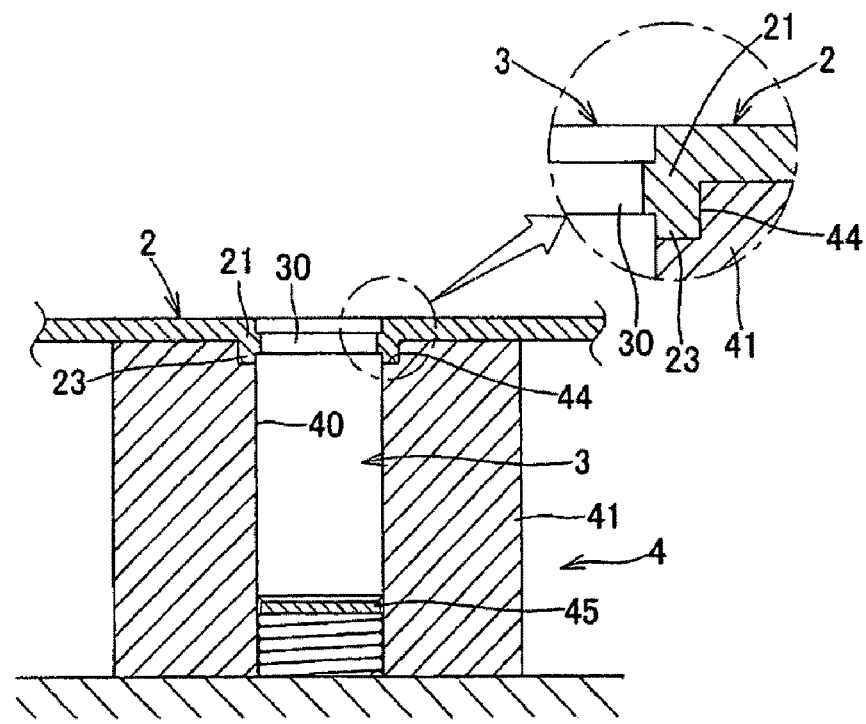
FIG. 13 is a sectional view showing a state where caulking is completed.

As shown in FIGS. 11 to 13, a caulked part has a supporting tool 41, a pressure punch 43 and a supporting base 45. The supporting tool 41 has an inserting hole 40 into which the columnar body 3 can be slid and guided and a notch groove 44 for forming the swollen flange 23 on the opening edge part, and abuts and supports the plate body 2 from the lower part. The pressure punch 43 directly or indirectly presses the thick part 21 from the side on which the cylindrical flange 22 is projected. The supporting base 45 supports the columnar body 3 so that the columnar body can be integrally moved in a state where the end surface of the columnar body 3 directly or indirectly abuts on the pressure punch.

First, the mounting hole 20 for inserting and assembling the columnar body 3 by burring is formed in the plate body 2. The thick part 21 composed of the cylindrical flange 22 by burring is formed along the inner circumferential edge of the mounting hole 20. At least the mounting hole 20 opened in a plate portion and the thick part 21 thereof need only to exist on the plate body 2. A structure except that of the plate portion may exist on the other portion.

On the other hand, on the outer circumferential surface near the end part of the columnar body 3 inserted into the mounting hole 20, the circumferential groove 30 with a predetermined depth is formed at the assembled position where the plate body 2 will be attached. The depth of the circumferential groove 30 is suitably set according to sizes of the thickness of the plate body 2 and the outer diameter of the shaft or the like so that sufficient strength can be maintained in a state where the thick part 21 of the plate body 2 is bitten and fixed simultaneously with the formation of the swollen flange 23. At least the circumferential groove 30 formed on the outer circumferential surface needs only to exist on the columnar body 3, and a structure except the axial shape may exist on other portion.

Figure 16:
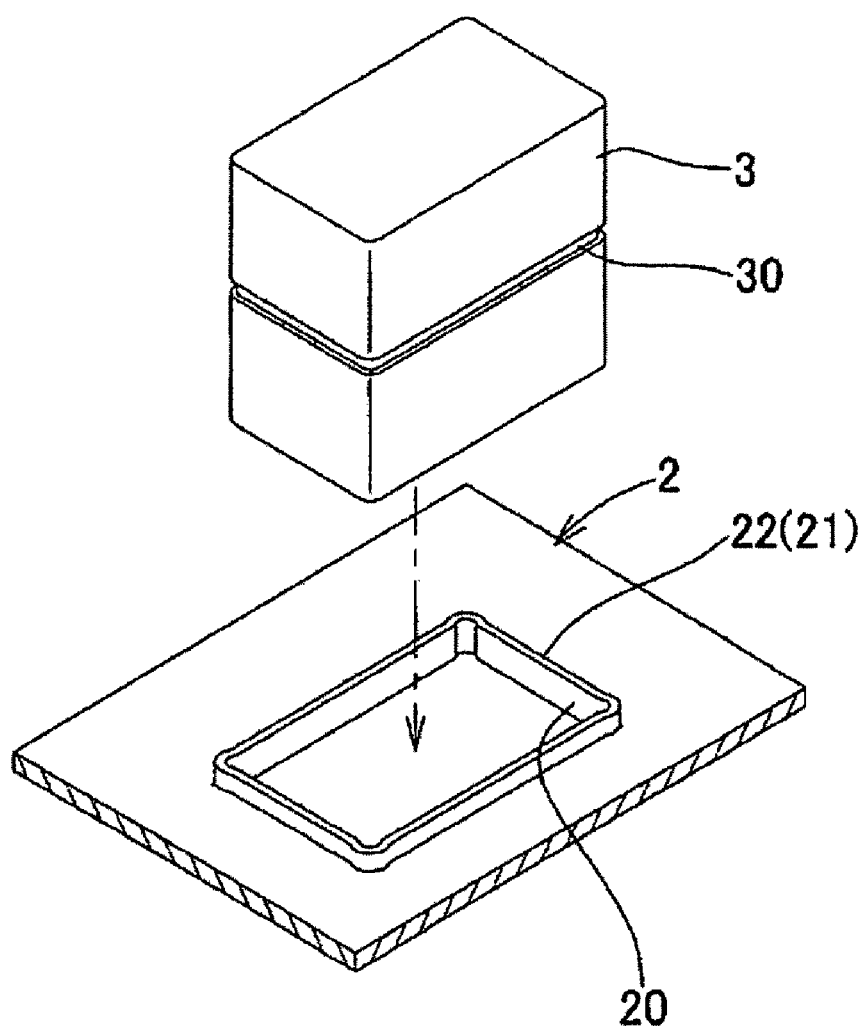
FIG. 16 shows a modification of each of members of a caulked assembly.

In this example, the mounting hole 20 of the plate body 2 on which the thick part 21 is formed is formed in a circular shape, and the columnar body has an outer circumferential surface having a circular shape in cross section for fitting the columnar body into the mounting hole 20. However, the present invention is not limited to such a shape at all. Even in the columnar body 3 having a different shape, circular arc shape or square shape or the like in cross section, as shown in FIG. 16, the plate body 2 can be assembled by forming the mounting hole 20 and the thick part 21 according to the shapes. Also, the columnar body 3 and the mounting hole 20 may not have the same shape. For example, it is preferable that the columnar body 3 has a polygonal shape in cross section, and the mounting hole 20 circumscribes to the columnar body 3. Also, it is preferable that the columnar body 3 has a circular shape in cross section and the mounting hole 20 has a polygon shape which circumscribes to the columnar body 3. The columnar body 3 may be solid. The columnar body 3 may be a cylindrical body such as a frame of a vehicle and pillar prepared by forming a thin plate in a cylindrical shape. In this case, the circumferential groove can be easily formed by pressing.

There is used the metal plate body 2 for plastically deforming the thick part 21. By contrast, various materials such as synthetic resins, ceramics, woods and compound fibers besides metals can be applied to the columnar body 3.

Next, as shown in FIG. 11, the plate body 2 is attached to a caulking tool 4. The caulking tool 4 includes the supporting tool 41 and the supporting base 45. The supporting tool 41 has the inserting hole 40 into which the columnar body 3 can be slid and guided and the notch groove 44 forming the swollen flange 23 on the opening edge part, and abuts and supports the plate body 2 from the lower part. The supporting base 45 supports the columnar body 3 so that the columnar body can be integrally moved in a state where the end surface of the columnar body 3 directly or indirectly abuts on the pressure punch 43. The columnar body 3 is inserted and set into the mounting hole 20 of the plate body 2 and the inserting hole 40 of the supporting tool 41 with the end surface of the side of the circumferential groove 30 up. Thereby, the thick part 21 and the circumferential groove 30 are opposed to each other.

The pressure punch 43 is pushed to the plate body 2 and columnar body 3 set to the caulking tool 4 from above. The columnar body 3 is integrally moved downwardly in a state where the columnar body 3 abuts on the pressure punch 43. As shown in FIG. 12, the cylindrical flange 22 constituting the thick part 21 is pressurized by the pressure punch 43. The surface opposite to the plate body 2 is swollen by this plastic deformation, and is then bitten into the notch groove 44 along the outer circumferential surface of the columnar body. Simultaneously, the surface is plastically deformed in the center direction of the mounting hole to be bitten into the space S in the circumferential groove 30 of the columnar body opposed to the surface. Finally, as shown in FIGS. 13, 14, the surface of the cylindrical flange 22 is made approximately flush with that of the plate body 2. The circumferential groove 30 and the notch groove 44 are respectively filled with the plastically deformed thick part 21 to form the swollen flange 23 and to obtain the caulked assembly 1 prepared by firmly integrating the plate body 2 and the columnar body 3.

In this example, the lower end of the columnar body is supported by spring energization, and can be downwardly moved together with the pressure punch 43 to prevent the compression of the columnar body. However, preferably, the columnar body 3 is also simultaneously compressed. Also, in the same manner as in the following sixth embodiment, compressive pressing may be conducted via a spacer member having a lower end part abutting on the thick part 21, and a cylindrical part having only the thick part abutting on the lower end of the pressure punch 43 may be integrally formed.

In preferable example, when the uneven surface (knurling groove) is formed over the whole circumference of the bottom part of the circumferential groove 30 of the columnar body 3 and the thick part 21 of the plate body 2 is bitten and fixed into the space S in the circumferential groove 30, the assembly strength is further enhanced by bitting the thick part 21 into this uneven surface. Referring to this uneven surface, the rotating strength can be further enhanced by forming the groove extending in the direction of crossing the circumferential direction, particularly a plurality of grooves extending in the axial direction at intervals. Although the uneven surface, particularly the groove is preferably processed by knurling, of course, the groove can be also formed by the other method. The knurling groove formed by knurling is also preferably formed in an oblique direction (spirally) and in a knitted loop shape in addition to the formation along the axial direction.

Next, a manufacturing method of a sixth embodiment will be described with reference to FIG. 15.

In the above fifth embodiment, the example in which the plate body 2 was assembled with the end part of the columnar body 3 was described. However, in this embodiment, an example in which the plate body 2 is assembled with the middle part of the columnar body 3 in place of the end part thereof will be described.

As shown in FIG. 15(*a*), the circumferential groove 30 is formed in the middle part in the axial direction of the columnar body 3. The plate body 2 assembled with the circumferential groove 30 is the same as that of the above fifth embodiment. While the columnar body 3 is set to a position where the circumferential groove 30 and the thick part 21 are opposed to each other by the same caulking tool 4 as that of the fifth embodiment, the spacer member 5 provided with the cylindrical part abutting on the upper end surface of the cylindrical flange 22 having the lower end part 50 constituting the thick part 21 is separately adhered on a portion upwardly projected from the plate body 2 above the circumferential groove 30.

The thick part 21 is pressurized to the lower side of the axial direction via the spacer member 5 by pushing the spacer member 5 from above by the pressure punch 43. Thereby, as in the fifth embodiment, as shown in FIG. 16(*b*), the space S in the circumferential groove 30 and the notch groove 44 are filled with the plastically deformed thick part 21 to form the swollen flange 23 and to obtain the caulked assembly 1 prepared by firmly integrating the plate body 2 and the columnar body 3.

Herein, although the spacer member 5 is formed in a shape with a bottom opened downward, the spacer member 5 may be formed in a cylindrical shape opened upward. In this example, the spacer member 5 is separately interposed between the pressure punch 43 and the thick part 21. However, preferably, the same cylindrical part as the spacer member 5 is integrally formed with the lower end part of the pressure punch 43. The material, structure and other modification or the like of the columnar body 3 and plate body 2 can be applied as in the fifth embodiment.

Next, a manufacturing method of a seventh embodiment will be described with reference to FIGS. 17 to 22.

Figure 17:
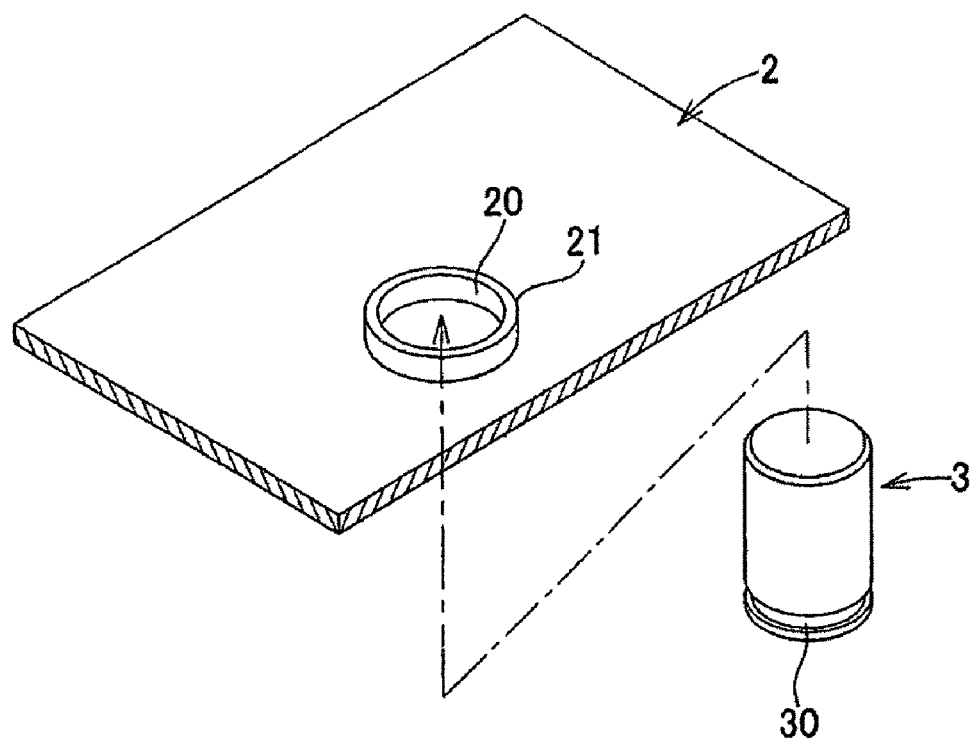
FIG. 17 is a perspective view showing members of a caulked assembly according to a seventh embodiment of the present invention.

As shown in FIG. 17, the caulked assembly 1 according to the present invention is prepared by assembling the metal plate body 2 made of magnesium or a magnesium alloy and the hollow or solid columnar body 3 by caulking, and is particularly suitable for electronic components or the like. However, it is needless to say that the caulked assembly 1 can be applied to various parts and products. In the following embodiments, an example in which the columnar body is also a member made of magnesium or a magnesium alloy is described. However, the columnar body is not limited thereto, and a member made of the other metal, and various materials such as synthetic resins, ceramics, woods and compound fibers can be applied.

In the plate body 2 made of the magnesium or a magnesium alloy, a mounting hole 20 for inserting and assembling the columnar body 3 is formed. Along the inner circumferential edge of the mounting hole, a thick part 21 is formed. In the following description, a hole edge part is erected in one direction by warm burring to form the thick part 21. However, the hole edge part may be processed to the other shape by the warm burring. The columnar body 3 has an outer circumferential surface on which a circumferential groove 30 with a predetermined depth is formed.

As described in the seventh to tenth embodiments, the columnar body 3 is inserted into the mounting hole 20 of the plate body 2, and the thick part 21 is compressively pressed from the axial direction in a state where the thick part 21 is opposed to the circumferential groove 30 to plastically deform the thick part 21 in the center direction of the hole. The thick part 21 is bitten and fixed into a space S in the circumferential groove 30.

Specifically, the caulked assembly 1 is processed using a manufacturing apparatus provided with a burring part, a groove processing means, a mounting means, and a caulking part. The burring part forms a mounting hole for inserting and assembling the columnar body 3 on the plate body 2 and forms a thick part by warm burring along the inner circumferential edge of the mounting hole. The groove processing means forms a circumferential groove with a predetermined depth at an assembled position of the outer circumferential surface of the columnar body inserted into the mounting hole. The mounting means inserts the columnar body 3 into the mounting hole 20 of the plate body 2 and sets the columnar body 3 to the assembled position where the thick part 21 is opposed to the circumferential groove 30. The caulking part compressively presses the thick part 21 from the axial direction, preferably in a warm state to plastically deform the thick part 21 in the center direction of the mounting hole to be bitten into the circumferential groove of the shaft part opposed to the thick part.

Figure 18:
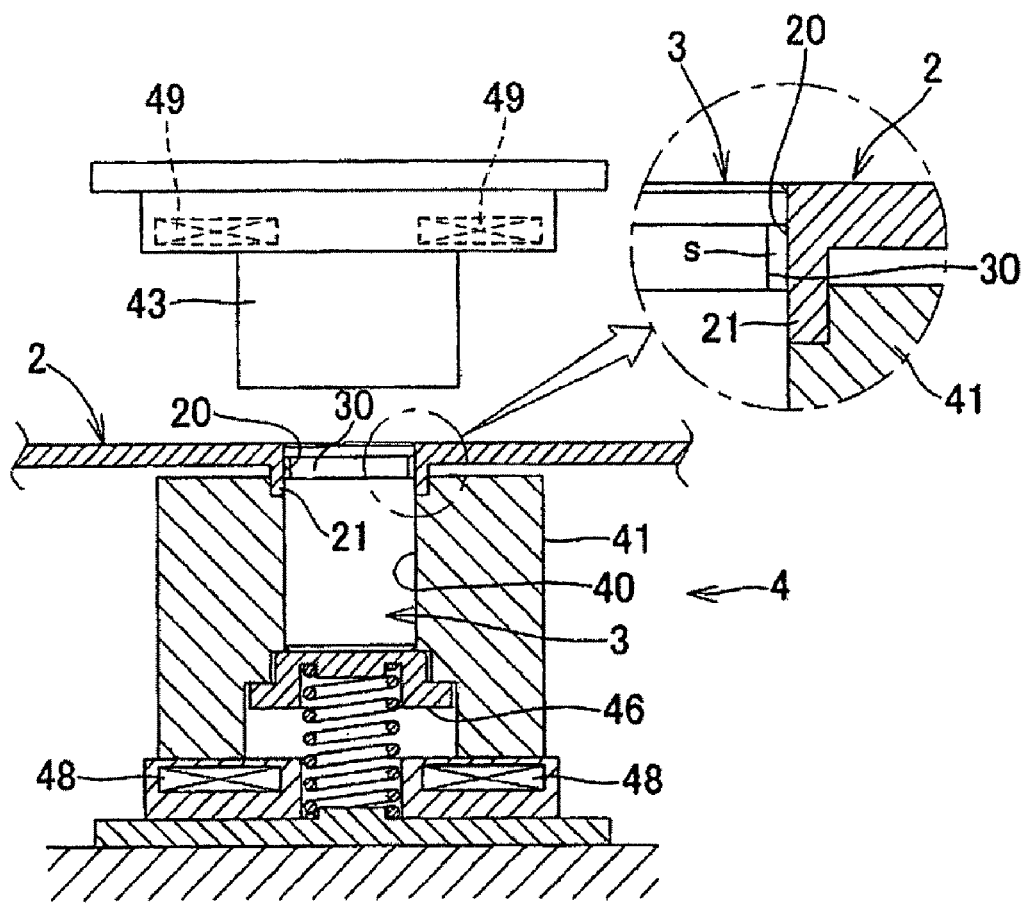
FIG. 18 is a sectional view showing a state where members are attached to a caulking tool in the seventh embodiment.
Figure 19:
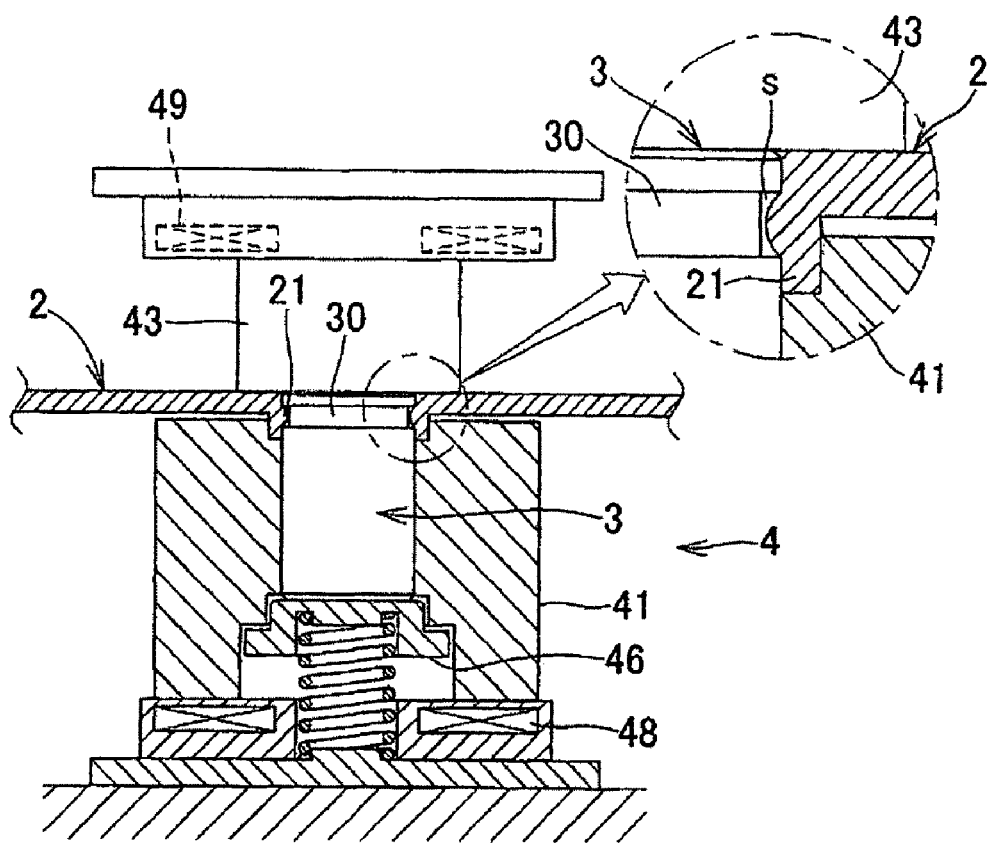
FIG. 19 is a sectional view showing a process in which a thick part is plastically deformed to be bitten into a circumferential groove of a columnar body.
Figure 20:
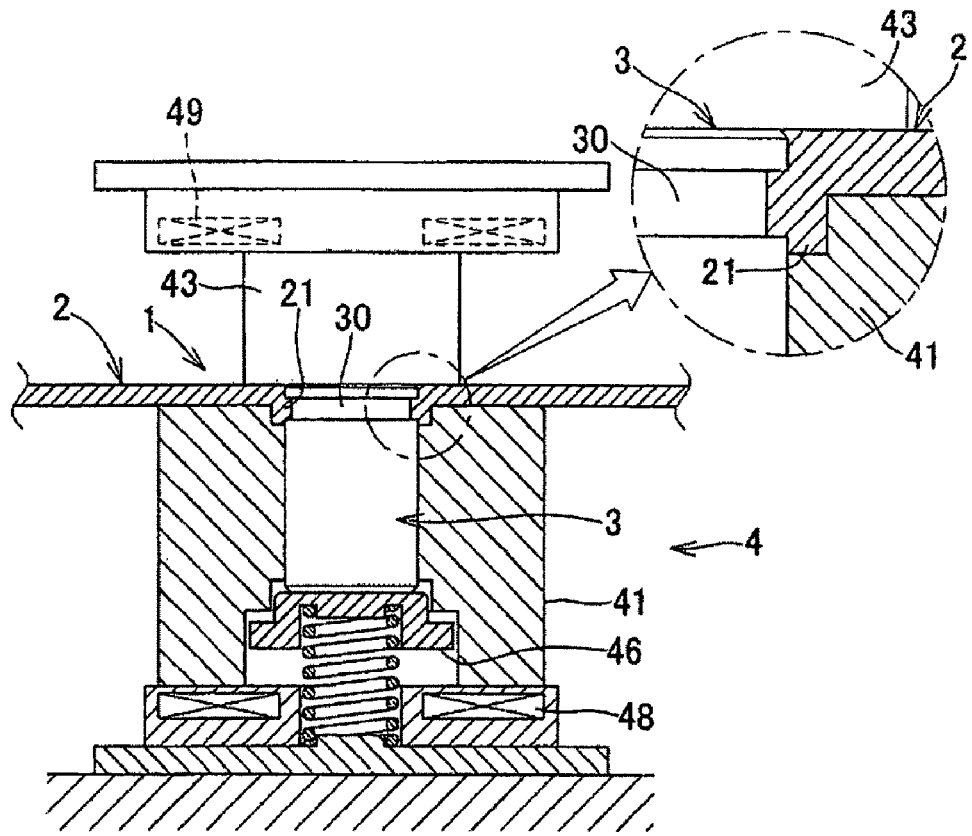
FIG. 20 is a sectional view showing a state where caulking is completed.

As shown in FIGS. 18 to 20, a caulked part has a receiving supporting tool 41, an elastic supporting tool 46, a heating base 47, and a pressure punch 43. The receiving supporting tool 41 has an inserting hole 40 into which the columnar body 3 can be slid and guided, and abuts and supports the thick part 21 of the plate body 2 from the lower part. The elastic supporting tool 46 supports the columnar body 3 while upwardly energizing the columnar body 3 at the circumferential part of the mounting hole 20. The heating base 47 is provided with a heating means such as a heater and supports the receiving supporting tool 41. The pressure punch 43 has a heating means, and directly or indirectly presses the thick part 21 from the other side of the axial direction.

First, the mounting hole 20 for inserting and assembling the columnar body 3 is formed in the plate body 2 made of magnesium or a magnesium alloy. The thick part 21 is formed without causing crack and fracture or the like along the inner circumferential edge of the mounting hole 20 by warm pressing. At least the mounting hole 20 opened in a plate portion and the thick part 21 thereof need only to exist on the plate body 2. A structure except that of the plate portion may exist on the other portion.

Figure 22:
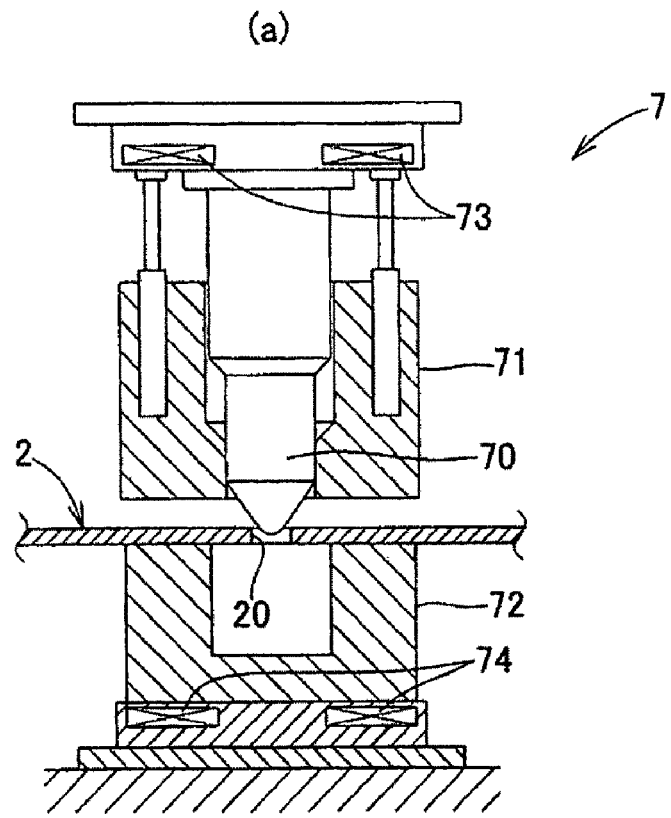
FIGS. 22(a) and 22(b) are sectional views showing a condition in burring.
Figure 22:
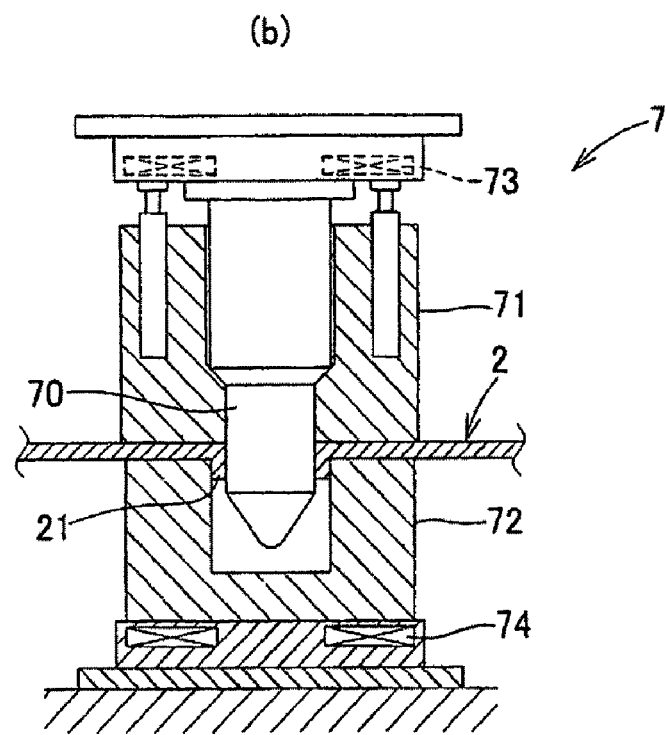

Referring to the warm pressing, warm burring is adopted in this example. Specifically, as shown in FIG. 22, a burring apparatus 7 can be used, which holds the plate body 2 having the mounting hole 20 between a stripper 71 moving up and down with a pressure punch 70 and a supporting die 72, and pushing the pressure punch 70 to perform burring. The pressure punch 70 and supporting die 72 respectively have heating means 73, 74, which can heat at about 300° C. previously before processing. In addition, a conventionally known burring apparatus can be also used.

On the other hand, on the outer circumferential surface of the columnar body 3 made of magnesium or a magnesium alloy and inserted into the mounting hole 20, the circumferential groove 30 with a predetermined depth is formed at the assembled position where the plate body 2 will be attached.

The depth of the circumferential groove 30 is suitably set according to sizes of the thickness of the plate body 2 and the outer diameter of the shaft or the like so that sufficient strength can be maintained in a state where the thick part 21 of the plate body 2 is bitten and fixed. At least the circumferential groove 30 formed on the outer circumferential surface needs only to exist on the columnar body 3, and a structure except the axial shape may exist on other portion.

Figure 26:
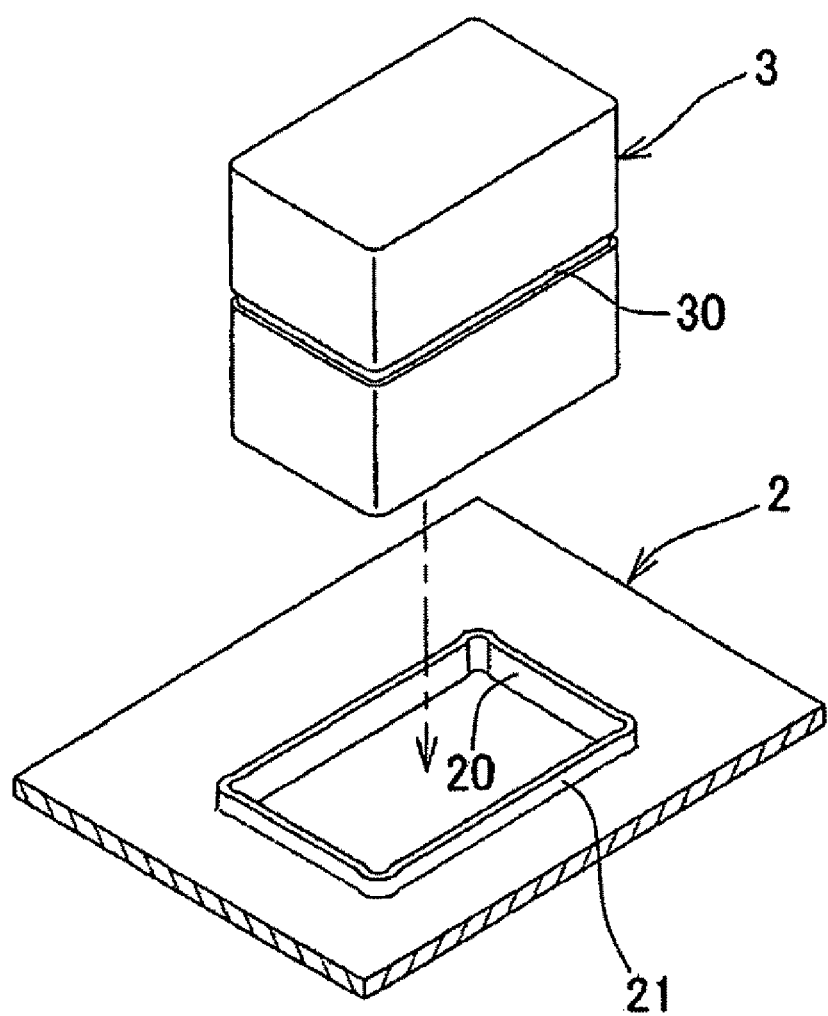
FIG. 26 shows a modification of each of members of a caulked assembly.

In this example, the mounting hole 20 of the plate body 2 on which the thick part 21 is formed is formed in a circular shape, and the columnar body is a shaft having an outer circumferential surface having a circular shape in cross section for fitting the columnar body into the mounting hole 20. However, the present invention is not limited to such a shape at all. Even in the columnar body 3 having a different shape, circular arc shape or square shape or the like in cross section, as shown in FIG. 26, the plate body 2 can be assembled by forming the mounting hole 20 according to the shapes. Also, the columnar body 3 and the mounting hole 20 may not have the same shape. For example, it is preferable that the columnar body 3 has a polygonal shape in cross section, and the mounting hole 20 circumscribes to the columnar body 3. Also, it is preferable that the columnar body 3 has a circular shape in cross section and the mounting hole 20 has a polygon shape which circumscribes to the columnar body 3. The columnar body 3 may be solid. The columnar body 3 may be a cylindrical body such as a frame of a vehicle and pillar prepared by forming a thin plate in a cylindrical shape. In this case, the circumferential groove can be easily formed by pressing.

Next, as shown in FIG. 18, the plate body 2 is attached to a caulking tool 4. The caulking tool 4 includes a receiving supporting tool 41, an elastic supporting tool 46, and a heating base 47. The receiving supporting tool 41 has an inserting hole 40 into which the columnar body 3 can be slid and guided, and abuts and supports the thick part 21 of the plate body 2 from the lower part. The elastic supporting tool 46 supports the columnar body 3 upwardly energizing the columnar body 3 in the mounting hole 20. The heating base 47 has a heating means 48 such as a heater and supports the receiving supporting tool 41. The columnar body 3 is inserted into the mounting hole 20 of the plate body 2 and the inserting hole 40 of the receiving supporting tool 41 with the circumferential groove 30 up. The upper end surface thereof is made approximately flush with the plate body 2, and the thick part 21 and the circumferential groove 30 are opposed to each other.

In this example, the thick part 21 formed by the burring of FIG. 22 is made downward, and the end part thereof is set so as to abut on the receiving supporting tool 41. However, the thick part 21 can be absolutely set so as to be made upward.

Figure 21:
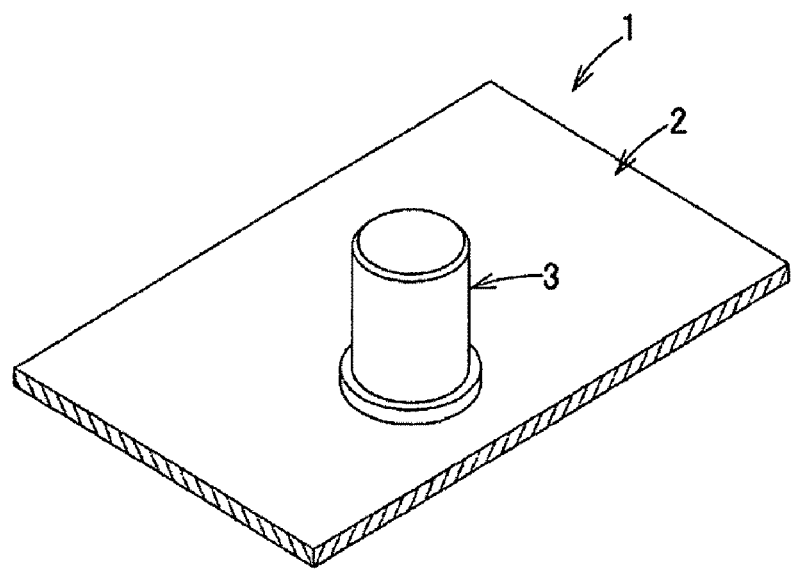
FIG. 21 is a perspective view showing a caulked assembly of the seventh embodiment.

The pressure punch 43 provided with a heating means 49 is pushed to the plate body 2 and columnar body 3 set to the caulking tool 4 from above. The thick part 21 is compressively pressed in a warm state between the flange part 31 of the columnar body 3 and the receiving supporting tool 41. In processing, the receiving supporting tool 41 and the pressure punch 43 are previously heated to about 300° C. by the above heating means 48, 49. By the warm compressive press, as shown in FIG. 19, the thick part 21 is plastically deformed in the center direction of the mounting hole, and is then bitten into the space S in the circumferential groove 30 of the shaft body opposed to the thick part 21 without causing crack and fracture or the like. Finally, as shown in FIGS. 20, 21, the circumferential groove 30 is filled with the plastically deformed thick part 21 to obtain the caulked assembly 1 made of magnesium or magnesium alloy and prepared by firmly integrating the plate body 2 and the columnar body 3.

Figure 23:
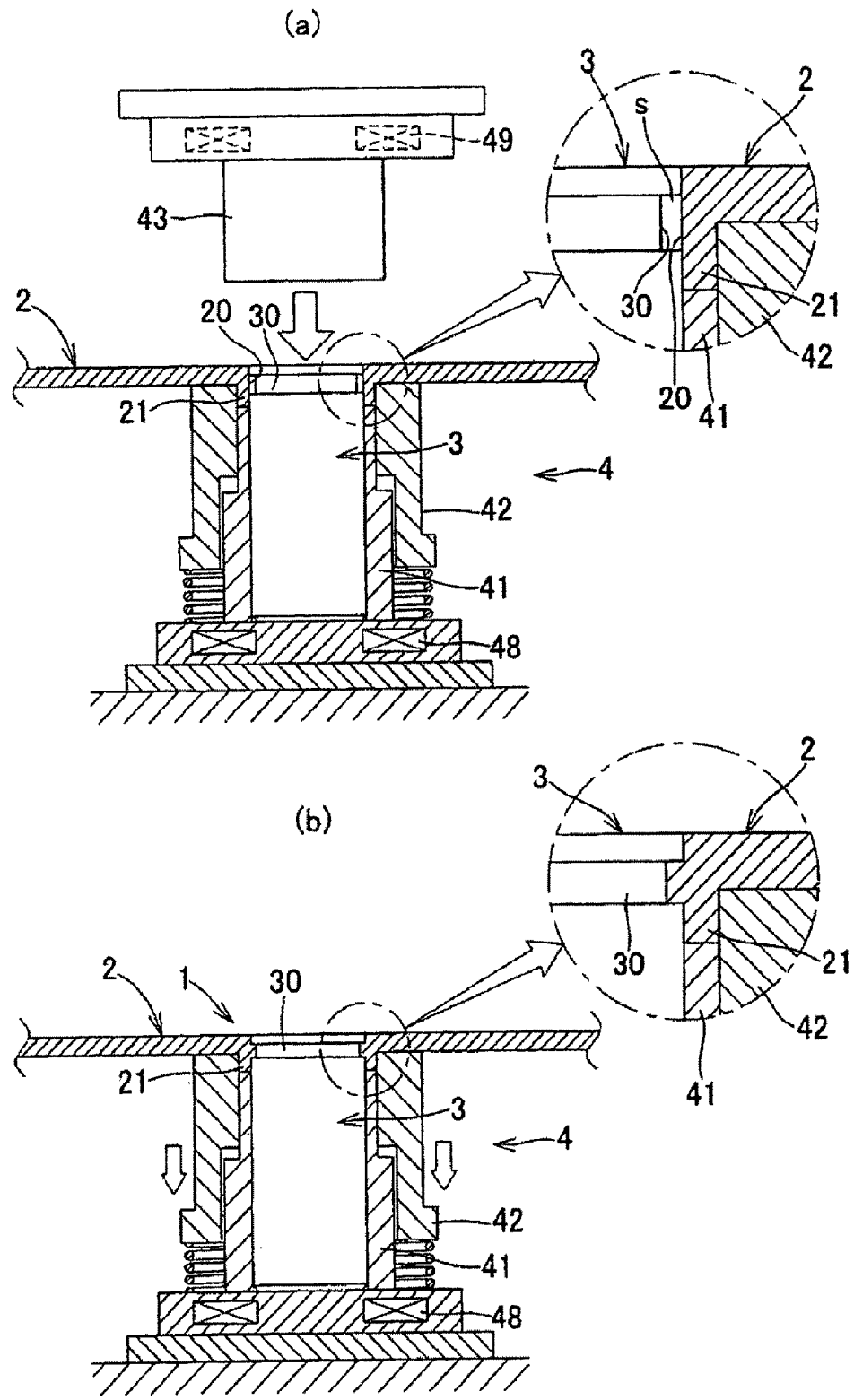
FIG. 23(a) is a sectional view showing a manufacturing method of an eighth embodiment.
FIG. 23(b) is a sectional view showing the manufacturing method of the eighth embodiment.

Next, a manufacturing method of an eighth embodiment will be described with reference to FIG. 23.

Although the example using the caulking tool 4 which elastically supports the columnar body 3 was described in the seventh embodiment, a method for assembling the columnar body 3 with the plate body 2 while elastically supporting the plate body 2 in place of providing such an elastic supporting tool 46 will be described in this embodiment.

As shown in FIG. 23(a), the caulking tool 4 of this embodiment includes a receiving supporting tool 41, an outer shape holding tool 42, and a heating base 47. The receiving supporting tool 41 has an inserting hole 40 into which the columnar body 3 can be slid and guided, and abuts and supports the thick part 21 of the plate body 2 from the lower part. The outer shape holding tool 42 supports the plate body 2 while upwardly energizing the plate body 2 at the circumferential part of the mounting hole 20. The heating base 47 is provided with a heating means 48 such as a heater and supports the receiving supporting tool 41. Heat generated in the heating base 47 is transmitted to the receiving supporting tool 41.

The plate body 2 made of the magnesium or magnesium alloy and subjected to warm burring is attached to the caulking tool 4 in the same manner as in the above seventh embodiment. The pressure punch 43 provided with the heating means 49 is pushed to the set plate body 2 and columnar body 3 from above. The thick part 21 is compressively pressed in a warm state between the heated receiving supporting tool 41 and the pressure punch 43. Thereby, as shown in FIG. 23(b), the circumferential groove 30 is filled with the thick part 21 plastically deformed in the center direction of the mounting hole to obtain the caulked assembly 1 made of magnesium or a magnesium alloy and prepared by firmly integrating the plate body 2 and the columnar body 3.

In this example, the columnar body 3 is also simultaneously compressed. However, preferably, the lower end of the columnar body is supported by spring energization as in the plate body 2 in the same manner as in the seventh embodiment, and thereby the columnar body can be downwardly moved together with the pressure punch 43 to prevent the compression of the columnar body 3. Also, in the same manner as in the following tenth embodiment, compressive pressing may be conducted via a spacer member having a lower end part abutting on the thick part 21, and a cylindrical part having only the thick part abutting on the lower end of the pressure punch 43 may be integrally formed. The material, structure and other modification or the like of the columnar body 3 and plate body 2 can be applied as in the seventh embodiment.

Figure 24:
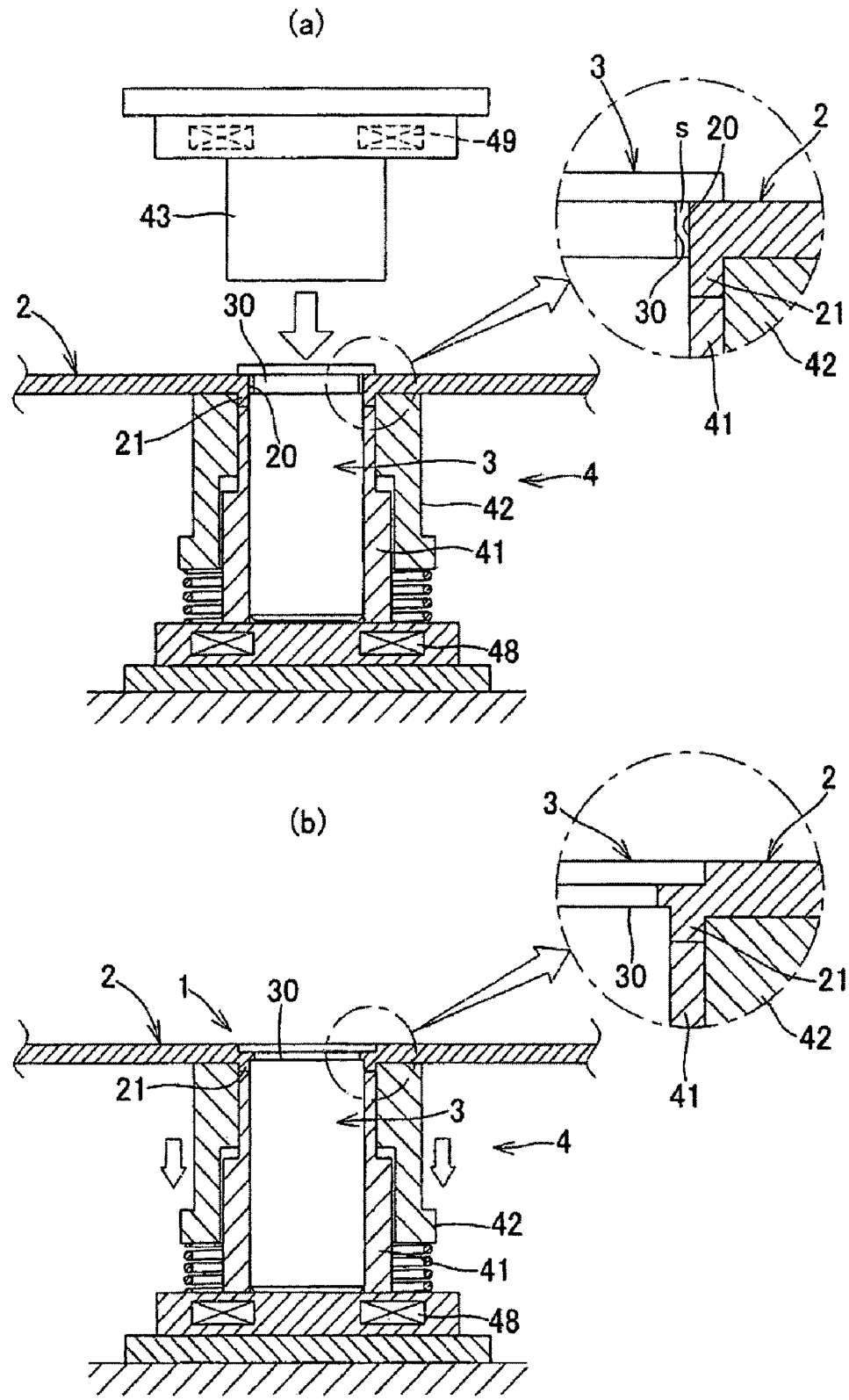
FIG. 24(a) is a sectional view showing a manufacturing method of a ninth embodiment.
FIG. 24(b) is a sectional view showing the manufacturing method of the ninth embodiment.

Next, a manufacturing method of a ninth embodiment will be described with reference to FIG. 24.

In this embodiment, the flange part 31 locked on the mounting hole 20 of the plate body 2 is formed on the end part of the columnar body 3. As shown in FIG. 24(a) in caulking, the plate body 2 made of magnesium or a magnesium alloy and subjected to warm burring is attached to the same caulking tool 4 as that of the eighth embodiment. The columnar body 3 is inserted into the mounting hole 20 of the plate body 2, and the inserting hole 40 of the receiving supporting tool 41 with the flange part 31 up. The flange part 31 is locked to the upper surface of the mounting hole 20. Thereby, the thick part 21 and the circumferential groove 30 are opposed to each other.

The pressure punch 43 provided with the heating means 49 is pushed from above to the plate body 2 and columnar body 3 which are set to the caulking tool 4. The thick part 21 is compressively pressed in a warm state between the heated receiving supporting tool 41 and the heated pressure punch 43 via the flange part 31 of the columnar body 3. Thereby, as shown in FIG. 24(b), the circumferential groove 30 is filled with the thick part 21 plastically deformed in the center direction of the mounting hole to obtain the caulked assembly 1 made of magnesium or a magnesium alloy and prepared by firmly integrating the plate body 2 and the columnar body 3. In the caulked assembly 1, the omission strength can be further enhanced compared with one having no flange part if a certain thickness of the flange part 31 can be secured.

Also in this example, the columnar body 3 is also simultaneously compressed. However, preferably, the lower end of the columnar body is supported by spring energization as in the plate body 2 in the same manner as in the seventh embodiment, and thereby the columnar body can be downwardly moved together with the pressure punch 43 to prevent the compression of the columnar body 3. The other modification or the like can be applied as in the seventh embodiment.

Figure 25:
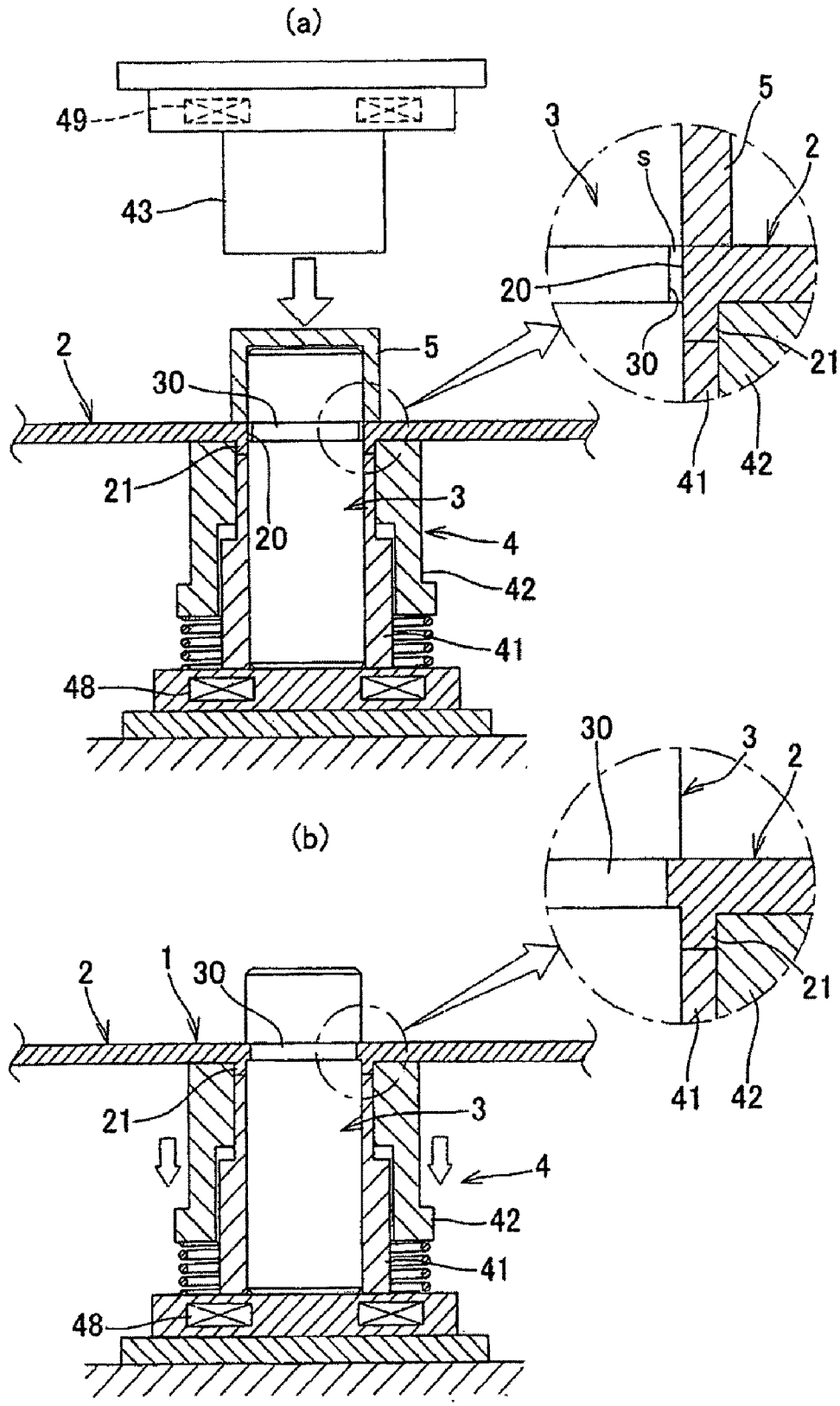
FIG. 25(a) is a sectional view showing a manufacturing method of a tenth embodiment.
FIG. 25(b) is a sectional view showing the manufacturing method of the tenth embodiment.

Next, a manufacturing method of a tenth embodiment will be described with reference to FIG. 25.

The example in which the plate body 2 was assembled with the end part of the columnar body 3 was described in the above seventh to ninth embodiments. In this embodiment, an example in which the plate body 2 is caulked with the middle part of the columnar body 3 will be described in place of the end part of the columnar body 3.

As shown in FIG. 25(a), the circumferential groove 30 is formed in the middle part in the axial direction of the columnar body 3, and the plate body 2 made of magnesium or a magnesium alloy and subjected to the same warm burring as that of the seventh embodiment is assembled with the columnar body 3. The columnar body 3 is set to a position where the circumferential groove 30 and the thick part 21 are opposed to each other by the same caulking tool 4 of the eighth embodiment. In addition, a spacer member 5 provided with a cylindrical part having a lower end part 50 abutting on the upper end surface of the thick part 21 is separately adhered on a portion upwardly projected from the plate body 2 above the circumferential groove 30.

The thick part 21 is compressively pressed between the spacer member 5 and the heated receiving supporting tool 41 by pushing the spacer member 5 by the heated pressure punch 43 from above. Thereby, as in the seventh embodiment, as shown in FIG. 25(b), the space S in the circumferential groove 30 is filled with the plastically deformed thick part 21 to obtain the caulked assembly 1 made of magnesium or a magnesium alloy and prepared by firmly integrating the plate body 2 and the columnar body 3.

Herein, although the spacer member 5 is formed in a shape with a bottom opened downward, the spacer member 5 may be formed in a cylindrical shape opened upward. Although the columnar body 3 is also compressed together from the middle by the spacer member 5, the space between the spacer member 5 and the upper end surface of the columnar body 3 may be sufficiently formed to prevent compressive force from acting on the columnar body 3. The heating means is also preferably provided on the spacer member 5 in place of providing the heating means on the pressure punch 43.

Furthermore, as in the plate body 2, preferably, the lower end of the columnar body is supported by spring energization, as in the tool of the seventh embodiment, and thereby the columnar body can be downwardly moved together with the spacer member 5 to prevent the compression of the columnar body. Although the spacer member 5 is separately interposed between the pressure punch 43 and the thick part 21 in this example, it is preferable that the same cylindrical part as the spacer member 5 is integrally formed with the lower end part of the pressure punch 43. The other modification or the like can be applied as in the seventh embodiment.

Next, an 11th embodiment will be described with reference to FIGS. 29 to 33.

Figure 29:
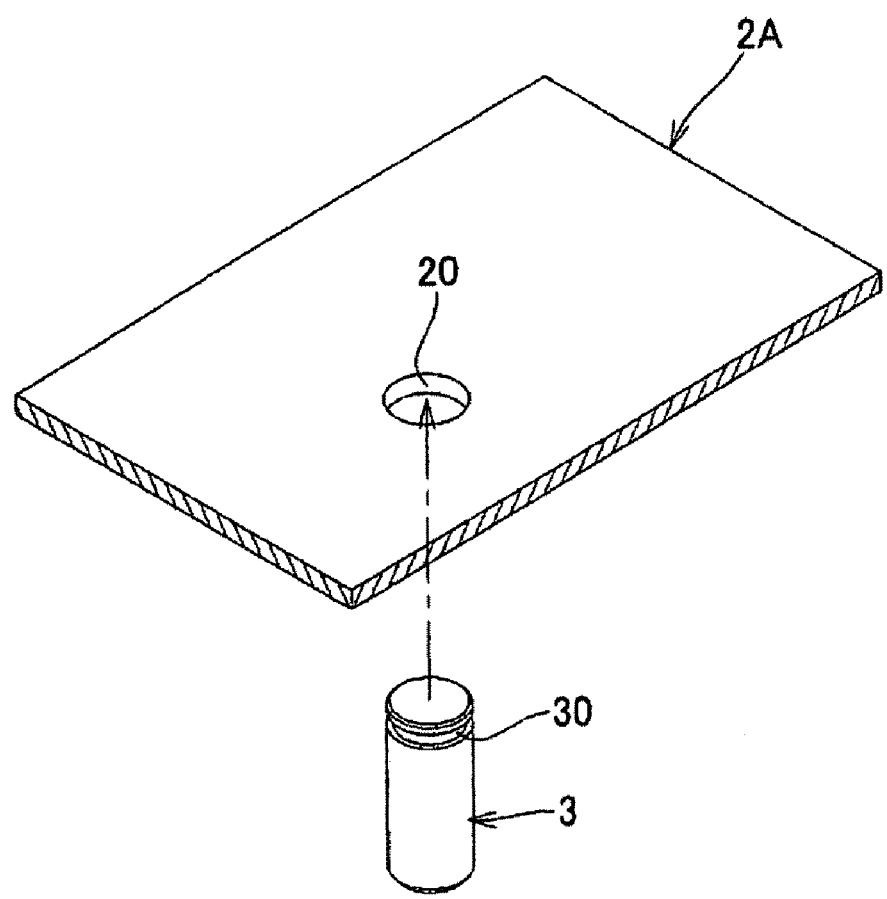
FIG. 29 is a perspective view showing members of an assembly according to an 11th embodiment of the present invention.

As shown in FIG. 29, an assembly according to the present invention is prepared by melting and pressing a resin molded body 2A made of a thermoplastic resin and a hollow or solid columnar body 3 made of a material having a higher melting point than that of the thermoplastic resin by supersonic vibration heat. The assembly is particularly suitable for electronic components or the like. However, it is needless to say that the assembly can be applied to various parts and products.

Although the resin molded body 2A of this embodiment is an illustrated plate body, the resin molded body 2A may have a form other than plate shape in a 14th embodiment to be described later. If this resin molded body 2A is made of a thermoplastic resin, the resin molded body into which various additives such as glass and reinforcing materials or the like are added can be used.

The through mounting hole 20 for inserting and assembling the columnar body 3 is formed in the resin molded body 2A, and the circumferential groove 30 having a predetermined depth and a predetermined width is formed on an outer circumferential surface of the columnar body 3.

Figure 30:
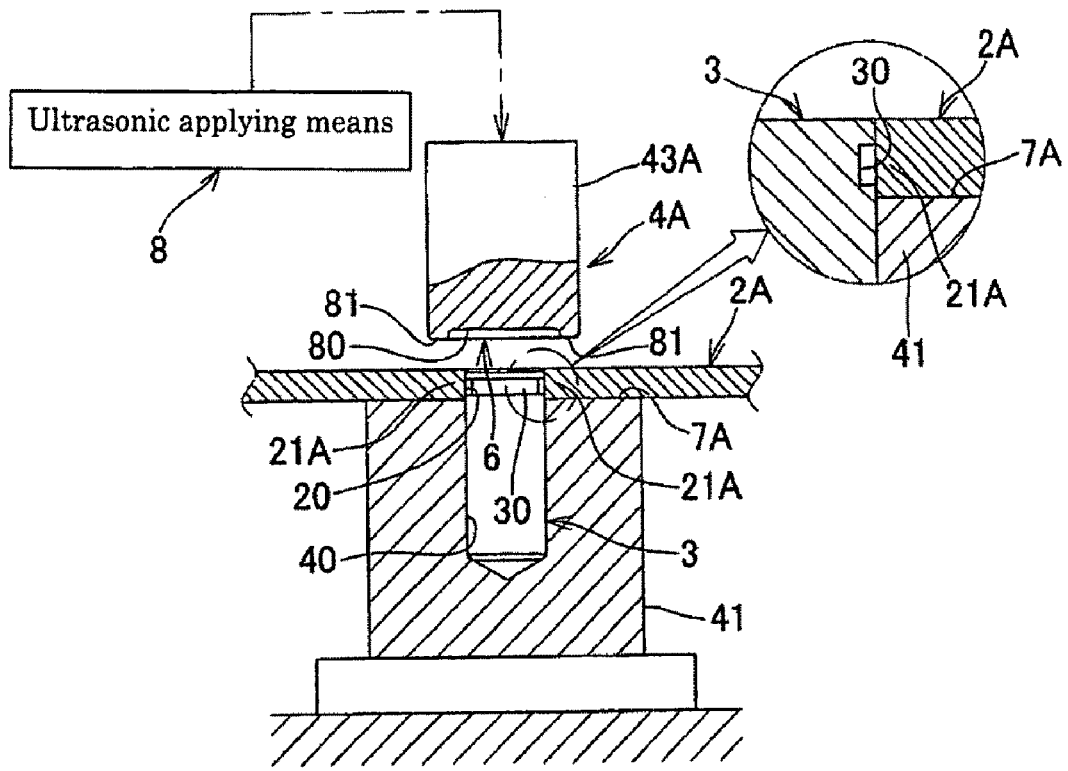
FIG. 30 is a sectional view showing a state where members are attached to a supporting tool 41 in the 11th embodiment.

As shown in FIG. 30, the columnar body 3 is inserted into the mounting hole 20 of the plate-shaped resin molded body 2A. In a state where the resin molded body 2A and the columnar body 3 are set to the assembled position where the inner circumferential surface of the mounting hole 20 and the circumferential groove 30 are opposed to each other, compressive force is applied to the circumferential part 21A of the mounting hole of the resin molded body 2A from the axial direction (vertical direction of FIG. 30), and supersonic vibration applied is from the compressed surface 6A. A material to be melted by supersonic vibration heat and located at the circumferential part of the mounting hole is made to flow into the circumferential groove 30 by compressive force (see an enlarged view of FIG. 31), and thereby the columnar body 3 is fixed to the mounting hole 20 of the resin molded body 2A.

More specifically, the caulked assembly is processed using the following manufacturing apparatus. The apparatus is provided with a mounting hole processing part, a groove processing means, a mounting means, a pressing means 4A, and an ultrasonic applying means 8. The mounting hole processing part forms the mounting hole 20 for inserting and assembling the columnar body 3 in the resin molded body 2A and is not shown. The groove processing means forms a circumferential groove with a predetermined depth at the assembled position of the outer circumferential surface of the columnar body inserted into the mounting hole 20 and is not shown. The mounting means inserts the columnar body 3 into the mounting hole 20 of the resin molded body 2A, is composed of a robot arm or the like for setting the columnar body 3 to the assembled position where the inner circumferential surface 30 of the mounting hole 20 and the circumferential groove 30 are opposed to each other, and is not shown. The pressing means 4A applies compressive force to the circumferential part of the mounting hole of the resin molded body 2A from the axial direction. The ultrasonic applying means 8 applies supersonic vibration from a surface to be compressed.

Figure 31:
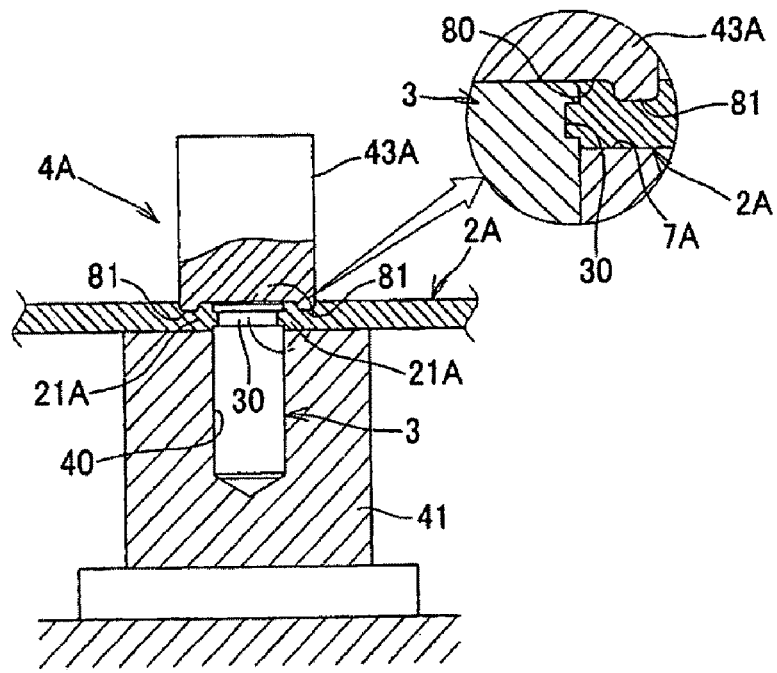
FIG. 31 is a sectional view showing a condition where a circumferential groove is filled with a material melted at a circumferential part of a mounting hole.
Figure 32:
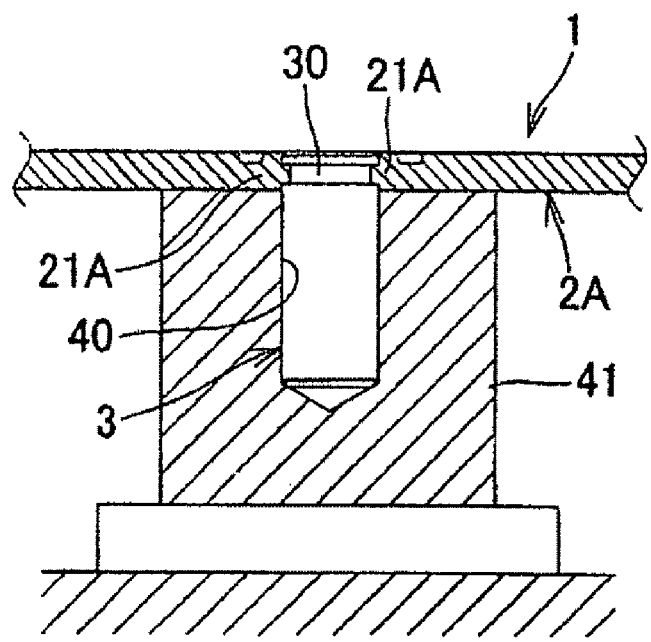
FIG. 32 is a sectional view showing a condition where caulking is completed.
Figure 33:
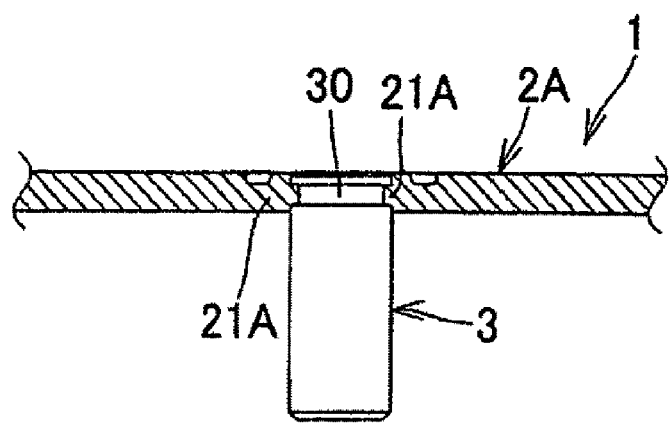
FIG. 33 is a sectional view showing a assembly after the completion of caulking.

As shown also in FIGS. 30 to 32, the pressing means 4A includes a supporting tool 41 and a pressure tool 43A. The supporting tool 41 has the inserting hole 40 for sliding and guiding the columnar body 3, and abuts and supports the circumferential part 21A of the mounting hole of the resin molded body 2A to be set to the columnar body from one side of the axial direction (the lower side in FIGS. 30 to 32). The pressure tool 43A presses the circumferential part 21A of the mounting hole from the other side of the axial direction (the upper side in FIGS. 30 to 32).

The ultrasonic applying means 8 oscillates an ultrasonic transducer which is not shown, using an ultrasonic oscillator. The ultrasonic applying means 8 transfers vibration to the pressure tool 43A which constitutes the pressing means 4A via a corn and horn or the like which are not shown, and applies supersonic vibration from the compressed surface 6A which abuts on the circumferential part 21A of the mounting hole.

On the compressed surface 6A of the pressure tool 43A which inputs supersonic vibration to the resin molded body 2A, there are provided a supporting surface 80 which supports the external surface of the resin molded body 2A, and an embedded part 81 which is projected to the tip side from the supporting surface 80 and is embedded in the resin molded body 2A. The embedded part may be provided at an opposite side to the side ultrasonically inputted, in this example, on the compressed surface of the side of the supporting tool 41 in addition to one formed at the side of the pressure tool 43A into which the supersonic vibration is inputted.

Hereafter, a manufacturing method of an 11th embodiment will be described with reference to FIGS. 29 to 33.

First, the through mounting hole 20 for inserting and assembling the columnar body 3 is formed in the plate-shaped resin molded body 2A. At least the mounting hole 20 opened in a plate-shaped portion needs only to exist on the resin molded body 2A. A structure except the plate shape may exist on the other portion.

On the other hand, on the outer circumferential surface of the columnar body 3 inserted into the mounting hole 20, the circumferential groove 30 with a predetermined depth and a predetermined width is formed at the assembled position where the resin molded body 2A will be attached. Not only one circumferential groove 30 but also a plurality of circumferential grooves 30 may be formed along the axial direction according to the length of the mounting hole 20 of the resin molded body 2A. At least the circumferential groove 30 formed on the outer circumferential surface needs only to exist on the columnar body 3, and a structure except the axial shape may exist on other portion.

Since the material of the resin molded body 2A is flowed and fixed into the circumferential groove 30, when the width of the circumferential groove 30 is too thin, the strength cannot be maintained. When the width is too large on the contrary, the material filling of the resin molded body 2A becomes insufficient, and the perpendicular degree of the assembly is reduced to cause worse strength adversely. The shallow depth cannot maintain the omission strength. On the contrary, the deep depth causes the inadequate material filling to result in the same demerit as the above description. The depth and width of the circumferential groove 30 can be determined as a proper size from the material and size of the resin molded body 2A, and the size or the like of the columnar body 3 in view of the above points.

Figure 38:
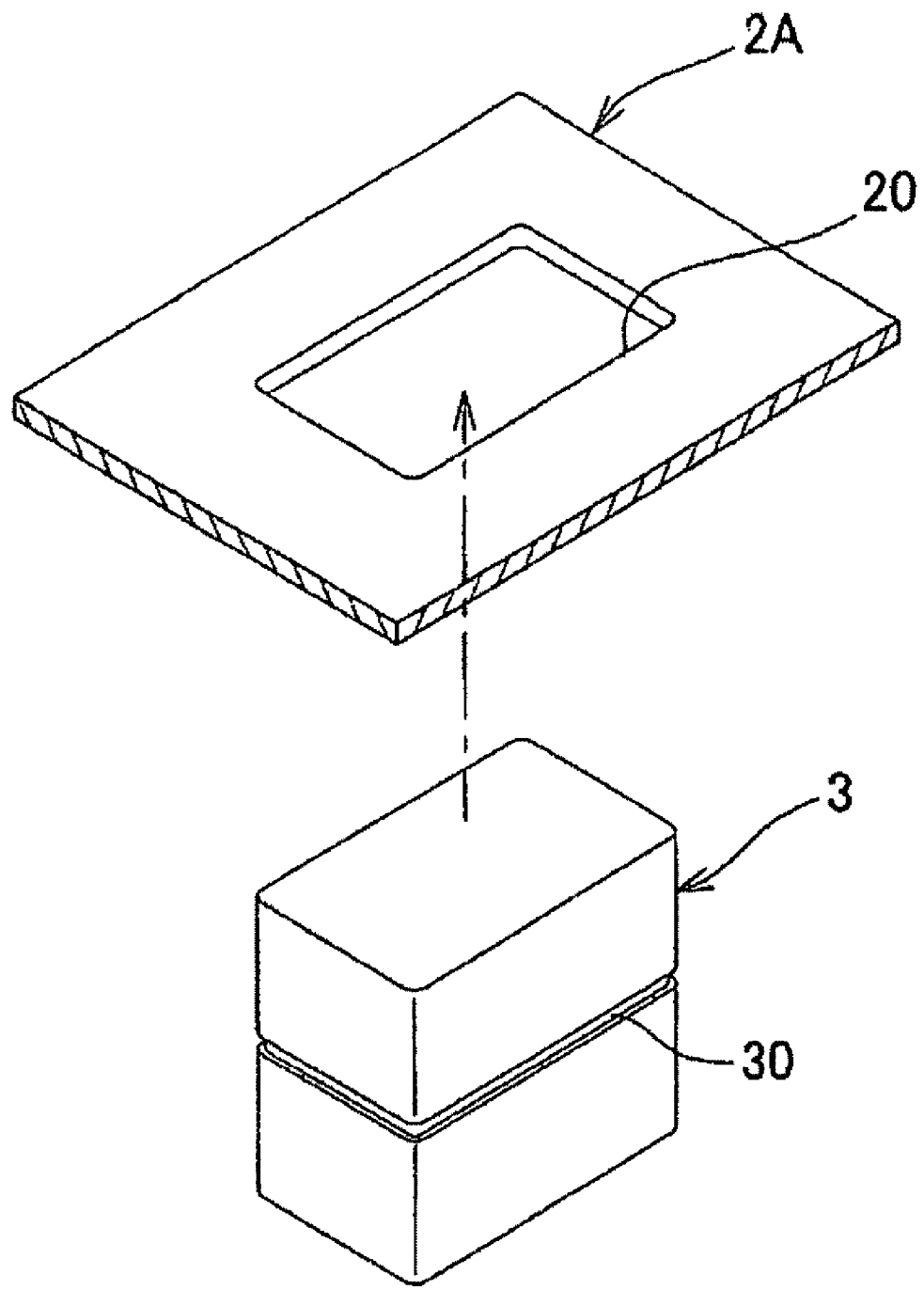
FIG. 38 shows a modification of each of members of an assembly.

In this example, the shape of the mounting hole 20 of the resin molded body 2A is formed in a circular shape, and the columnar body is a shaft body having an outer circumferential surface having a circular shape in cross section for fitting the columnar body into the mounting hole 20. However, the present invention is not limited to such a shape at all. Even in the columnar body 3 having a different shape, circular arc shape or square shape or the like in cross section, as shown in FIG. 38, the resin molded body 2A can be assembled by forming the mounting hole 20 according to the shapes. Also, the columnar body 3 and the mounting hole 20 may not have the same shape. For example, it is preferable that the columnar body 3 has a polygonal shape in cross section, and the mounting hole 20 circumscribes to the columnar body 3. Also, it is preferable that the columnar body 3 has a circular shape in cross section and the mounting hole 20 has a polygon shape which circumscribes to the columnar body 3. The columnar body 3 may be solid, and be prepared by forming a thin plate in a cylindrical shape.

As long as the columnar body 3 has a higher melting point than that of the thermoplastic resin which constitutes the resin molded body 2A, various materials such as metals, synthetic resins, ceramics, woods and compound fibers can be applied to the columnar body 3.

Next, as shown in FIG. 30, the resin molded body 2A is attached to the supporting tool 41 which has an inserting hole 40 capable of sliding and guiding the columnar body 3, and abuts and supports the circumferential part 21A of the mounting hole of the resin molded body 2A from the lower surface. The columnar body 3 is set to a position where the upper surface thereof is made flush with the upper surface of the resin molded body 2A to the mounting hole 20 of the resin molded body 2A and the inserting hole 40 of the supporting tool 41 with the circumferential groove 30 up. Thereby, the inner circumferential surface of the mounting hole 20 and the circumferential groove 30 are opposed to each other.

The pressure tool 43A is pushed to the resin molded body 2A and columnar body 3 which are set to the supporting tool 41 from above. Compressive force is vertically applied to the circumferential part 21A of the mounting hole from the axial direction, and supersonic vibration is applied from the compressed surface 6A of the pressure tool 43A. The circumferential part 21A of the mounting hole of the resin molded body 2A is melted by supersonic vibration heat. In this state, while the material pushed aside by the embedded part 81 of the compressed surface 6A of the pressure tool 43A is supported by the supporting surface 80 and the compressed surface 7A, as shown in FIG. 31, the material is moved into the inside of the mounting hole. The material located at the circumferential part of the mounting hole flows into the circumferential groove 30, and thereby the columnar body 3 is fixed to the resin molded body 2A.

Figure 34:
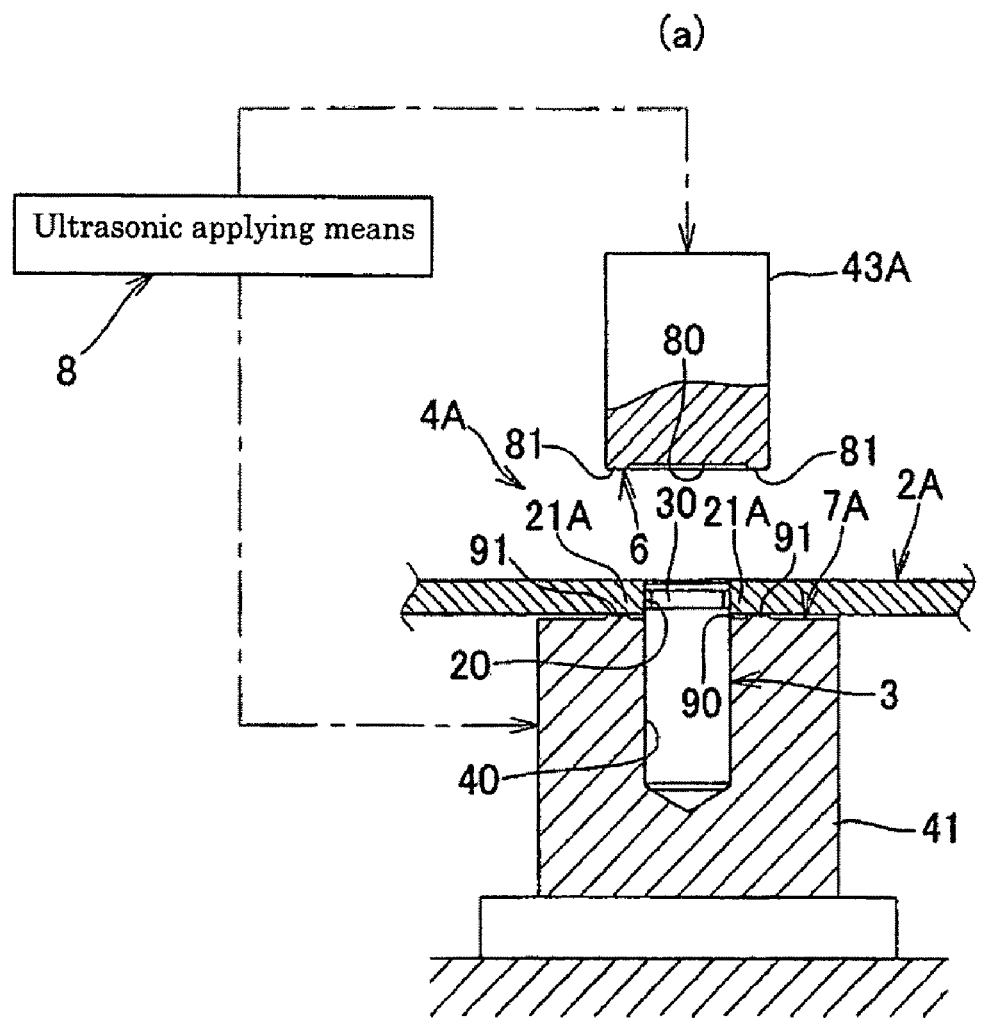
FIG. 34(a) is a sectional view showing a manufacturing method of a 12th embodiment.
FIG. 34(b) is a sectional view showing the manufacturing method of the 12th embodiment.
Figure 34:
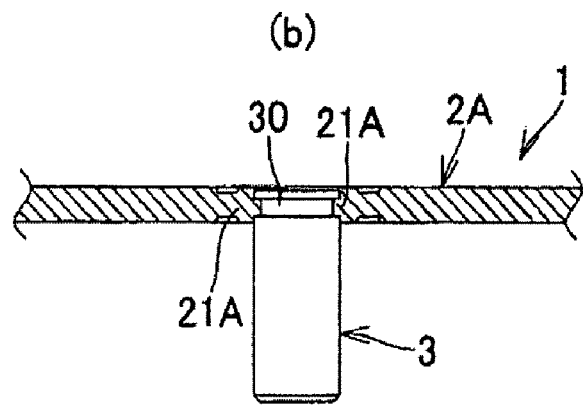

Next, a manufacturing method of a 12th embodiment will be described with reference to FIG. 34.

Applying supersonic vibration from the compressed surface 6A of the pressure tool 43A, and mainly moving the circumferential part 21A of the mounting hole of the resin molded body 2A into the mounting hole in the embedded part 81 of the pressure tool 43A was described in the above 11th embodiment. However, in this embodiment, supersonic vibration is simultaneously applied not only from the compressed surface 6A of the pressure tool 43A but also from the compressed surface 7A of the side of the supporting tool 41. In addition, the circumferential part 21A of the mounting hole is pressed from both the embedded part 91 formed in the compressed surface 7A and the embedded part 81 of the side of the pressure tool 43A, and thereby the material located at the circumferential part of the mounting hole is efficiently made to flow into the circumferential groove 30.

In this case, each of the projected amounts of both embedded parts 81, 91 is less than that of the embedded part 81 of the above 11th embodiment. Referring to pressing marks formed in the assembly, deep pressing marks remain at the side of the pressure tool in the above 11th embodiment. However, in this example, only shallow pressing marks remain on both the surfaces, and the example has also good showing and is advantageous also in view of the strength. As shown in FIG. 34, these embedded parts 81, 91 may be provided at a position where the embedded parts 81, 91 are opposed to each other. However, if the embedded parts 81, 91 are provided at the position where the embedded parts 81, 91 are not opposed to each other and shifted, the pressing marks are also shifted with each other, which become more advantageous in view of the strength.

If the supersonic vibration is inputted from the side of the supporting tool 41 as shown in this example, the processing can be performed as in the 11th embodiment, and thereby the supersonic vibration may be inputted only from the side of the supporting tool 41 without inputting the supersonic vibration from the side of the pressure tool 43A. The material, structure, and other modification of the columnar body 3 and resin molded body 2A can be applied as in the 11th embodiment.

Figure 35:
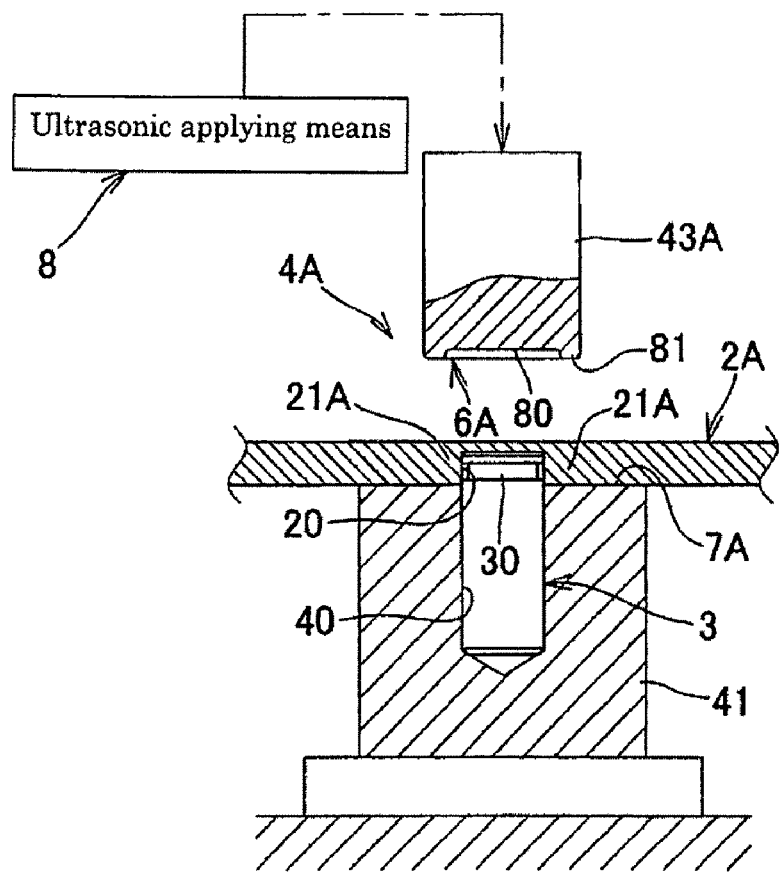
FIG. 35(a) is a sectional view showing a manufacturing method of a 13th embodiment.
FIG. 35(b) is a sectional view showing the manufacturing method of the 13th embodiment.
Figure 35:
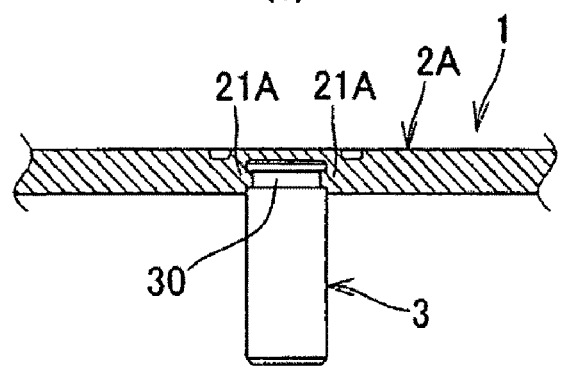

Next, a 13th embodiment will be described with reference to FIG. 35.

Although the mounting hole 20 formed in the resin molded body 2A was a through hole in the above 11th and 12th embodiments, the columnar body 3 is assembled with the bottomed mounting hole 20 in this embodiment. Thus, even if the mounting hole 20 is not the through hole, the resin molded body 2A can be assembled with the columnar body 3 by the same method. In FIG. 35, the supersonic vibration is inputted from the side of the pressure tool 43A to push out the circumferential part 21A of the mounting hole in the embedded part 81 of the compressed surface 6A to make the material located at the circumferential part of the mounting hole to flow into the circumferential groove 30. However, the supersonic vibration may be inputted from the side of the supporting tool 41. As described in the above 12th embodiment, of course, the supersonic vibration may be inputted from both the sides. The material, structure, and other modification or the like of the columnar body 3 and resin molded body 2A can be applied as in the 11th embodiment.

Figure 36:
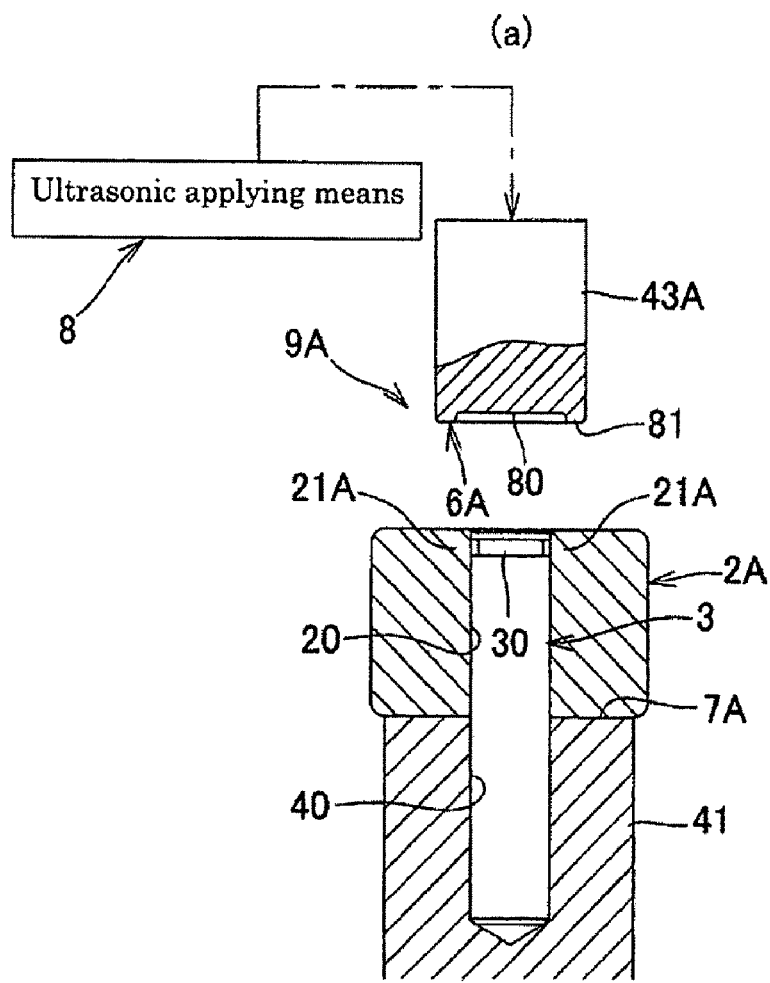
FIG. 36(a) is a sectional view showing a manufacturing method of a 14th embodiment.
FIG. 36(b) is a sectional view showing the manufacturing method of the 14th embodiment.
Figure 36:
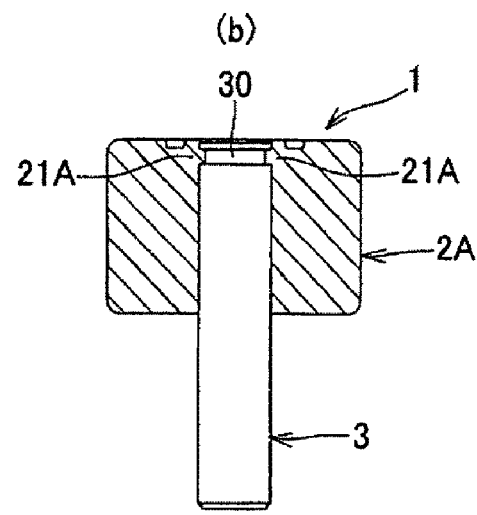

Next, a 14th embodiment will be described with reference to FIG. 36.

Although the example using the resin molded body 2A as the plate body was described in each of the above embodiments, the resin molded body 2A may have the other shape as described above. In this embodiment, the example using the resin molded body 2A having no plate shape and having a three-dimensional object with a width will be described.

In this case, the length of the mounting hole 20 is increased. The circumferential groove 30 of the columnar body 3 is formed at a position near the side of the pressure tool 43A into which the supersonic vibration is inputted. The melted material of the circumferential part of the mounting hole is efficiently flown into the circumferential groove 30. When the length of the mounting hole 20 is increased in this example, a plurality of circumferential grooves 30 are desirably formed. Particularly, as described in the above 12th embodiment, if the supersonic vibration is simultaneously inputted also from the side of the supporting tool 41, and the circumferential groove 30 is further formed at a position near the compressed surface 7A of the supporting tool 41, preferably, the columnar body 3 can be fixed at the both ends side of the long mounting hole 20 to obtain the firm assembled strength. The material, structure and other modification of the columnar body 3 and resin molded body 2A can be applied as in the 11th embodiment.

Figure 37:
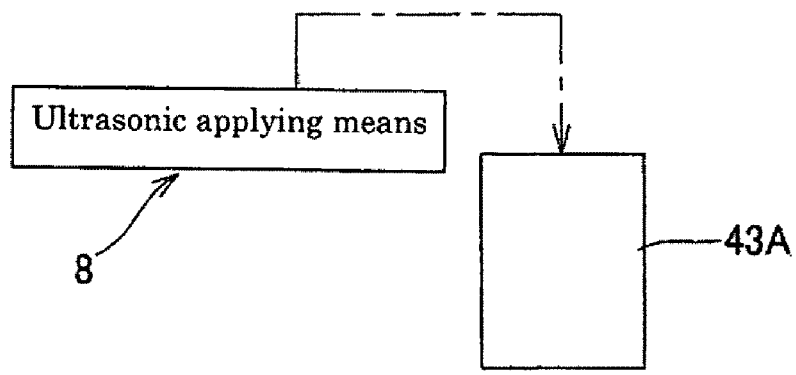
FIG. 37(a) is a sectional view showing a manufacturing method of a 15th embodiment.
FIG. 37(b) is a sectional view showing the manufacturing method of the 15th embodiment.
Figure 37:
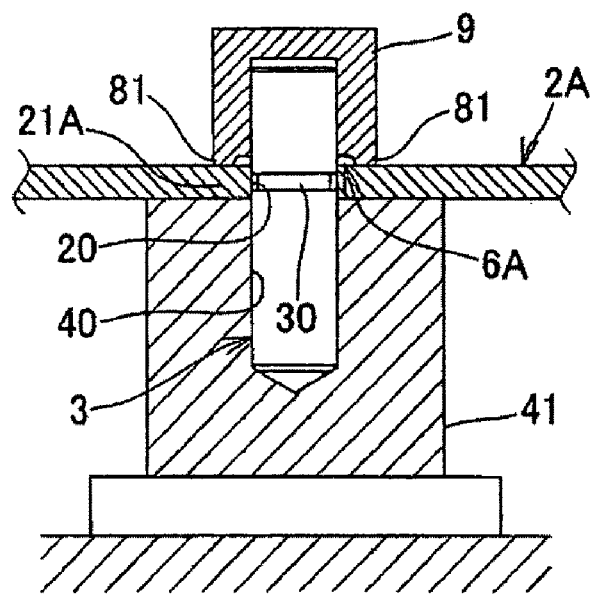
Figure 37:
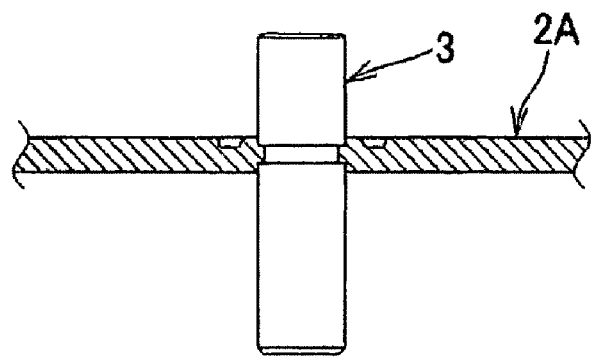

Next, a 15th embodiment will be described with reference to FIG. 37.

Although the example in which the resin molded body 2A was assembled with the end part of the columnar body 3 was described in each of the above embodiments, an example in which the resin molded body 2A is assembled with the middle part of the axial direction of the columnar body 3 will be described in this embodiment. In this example, a spacer member 9 having a lower end part on which a compressed surface 6A is formed is separately adhered on a portion upwardly projected from the resin molded body 2A of the columnar body 3 set to the supporting tool 41.

While the circumferential part 21A of the mounting hole of the resin molded body 2A is compressed between the spacer member 9 and the supporting tool 41 by pushing the spacer member 9 by the pressure tool 43A from above, supersonic vibration is inputted into the circumferential part 21A of the mounting hole via the spacer member 9 from the pressure tool 43A. As in the 11th embodiment, the melted material of the circumferential part is flown into the circumferential groove 30 to obtain the assembly 1.

Herein, although the spacer member 9 is formed in a shape with a bottom opened downward, the spacer member 9 may be formed in a cylindrical shape opened upward. The spacer member 9 is made of a metal material or the like which can transmit efficiently the supersonic vibration from the pressure tool 43A, and is preferably made of the same material as that of the pressure tool 43A. Preferably, the same cylindrical part as the spacer member 9 at the lower end part of the pressure tool 43A is integrally formed in place of providing the spacer member 9. In addition, the material and structure of the columnar body 3 and the resin molded body 2A, the input direction of ultrasonic wave, and the other modification or the like can be applied as in the 11th and 12th embodiments.

As described above, the embodiments of the present invention were described. However, the present invention is not limited to the examples. It is needless to say that the present invention can be carried out in various forms without departing from the spirit of the present invention.

EXAMPLES

Next, the result of strength test of each of caulked assemblies of examples 1 to 6 assembled by the manufacturing method of the present invention will be described.

Examples 1 to 6 are respectively prepared by assembling the end part of a columnar body (shaft body) made of an aluminium alloy with a plate body made of an aluminium alloy by caulking in the method of the first embodiment. The outer diameters of the columnar bodies and the plate thicknesses of the plate bodies are shown in Table 1.

TABLE 1

| | Outer diameter (mm) of columnar body | Plate thickness (mm) of plate body |
|---|---|---|
| Example 1 | 6.15 | 1.5 |
| Example 2 | | 2.5 |
| Example 3 | 11.0 | 1.5 |
| Example 4 | | 2.5 |
| Example 5 | 15.0 | 1.5 |
| Example 6 | | 2.5 |

In these examples 1 to 6, push-in strength, falling strength and rotating strength (only examples 3 to 6) were respectively tested. Referring to the push-in strength, as shown in FIG. 40(a), a plate body 2 is placed on a base 6 in which an escaping hole 60 is formed. The plate body is fixed to the base 6 at a position where a columnar body 3 vertically provided is immediately above the escaping hole. The presence or absence of the omission of the columnar body is observed by amassing a block on the upper end of the columnar body to gradually load the vertical load downward.

Referring to the falling strength, as shown in FIG. 40(b), the plate body 2 is fixed to a supporting plate 62 extending upward from the base 61. The presence or absence of the falling of the columnar body is observed by gradually loading the vertical load downward at a position apart from by a predetermined distance H along the projection direction of the columnar body 3 extending in a transverse direction. The distances H of examples 1 to 4 and examples 5, 6 were respectively set to 7 mm and 40 mm.

Referring to the rotating strength, as shown in FIG. 40(c), the plate body 2 is fixed to the supporting plate 62 as in the falling strength, and the presence or absence of relative rotation of the columnar body is observed by gradually loading rotation torque to the columnar body. The rotating strength was measured in only examples 3 to 6.

The results of the tests were as shown in Tables 2 to 4, and standard strength was cleared in all tests.

TABLE 2

(Push-In Strength Test Results)

| | Standard | Test result |
|---|---|---|
| Example 1 | 700 N | No omission in 700 N |
| Example 2 | | No omission in 700 N |
| Example 3 | 2000 N | No omission in 2000 N |
| Example 4 | | No omission in 2000 N |
| Example 5 | 5000 N | No omission in 5000 N |
| Example 6 | | No omission in 5000 N |

TABLE 3

(Falling Strength Test Results)

| | Standard | Test result |
|---|---|---|
| Example 1 | 300 N | No inclination in 300 N |
| Example 2 | | No inclination in 300 N |
| Example 3 | 600 N | No inclination in 600 N |
| Example 4 | | No inclination in 600 N |
| Example 5 | 1100 N | No inclination in 1150 N |
| Example 6 | | No inclination in 1150 N |

TABLE 4

(Rotation Strength Test Results)

| | Standard | Test result |
|---|---|---|
| Example 3 | 3.0 Nm | Rotation start at 4.0 Nm |
| Example 4 | | Rotation start at 4.0 Nm |
| Example 5 | 4.0 Nm | Rotation start at 5.0 Nm |
| Example 6 | | Rotation start at 5.0 Nm |

Next, the results of the strength tests for the caulked assembly (three samples) of example 7 assembled by the manufacturing method of the above second embodiment and the caulked assembly (three samples) of example 8 assembled by the manufacturing method (with the knurling groove) of the above fourth embodiment will be respectively described.

Examples 7, 8 are prepared by assembling a plate body of an electricgalvanized steel plate (SECC) to the end part of an iron columnar body (round bar) by caulking. The outer diameter of the shaft body is 7.0 mm, and the plate thickness of the plate body is 0.8 mm. For these examples 7, 8, the push-in strength, the falling strength and the rotating strength were tested on the same condition by the method shown in FIGS. 40(*a*) to 40(*c*), and the perpendicular degree was measured by a three-dimensional measuring device. FIG. 5 shows that the rotating strength is exponentially improved by applying knurling of the fourth embodiment. Both the push-in strength and the rotating strength clear the standard strength (push-in strength: 245 N or more, rotating strength: 0.98 Nm or more).

TABLE 5

| | Perpendicular degree (mm) | Push-in strength (N) | Falling strength (N) | Rotating strength (Nm) |
|---|---|---|---|---|
| Example 7-1 | 0.01 | 1862 | 275 | 1.35 |
| Example 7-2 | 0.04 | 1862 | 235 | 1.37 |
| Example 7-3 | 0.05 | 1862 | 245 | 1.37 |
| Example 8-1 | 0.01 | 1911 | 227 | 4.1 |
| Example 8-2 | 0.02 | 1911 | 255 | 4.1 |
| Example 8-3 | 0.05 | 1911 | 253 | 4.1 |

Next, the results of tests of caulked assemblies of examples 9, 10 and caulked assemblies of comparative examples 1, 2 will be described.

Examples 9, 10 are respectively prepared by assembling a plate body of an electricgalvanized steel plate (SECC) to the end part of an iron columnar body (round bar) by caulking by the method of the above fifth embodiment. The outer diameters of each of the columnar bodies are 8.5 mm, and the plate thicknesses of the plate bodies are 0.8 (mm).

In comparative examples 1, 2, the swollen flange is not formed as shown in the present invention. As shown in FIG. 6, the columnar body 3 having the circumferential groove 30, and the plate body 2 having the thick part 21 are prepared as in the present application. The plate body 2 is attached to the caulking tool 4. The caulking tool 4 includes a receiving supporting tool 41 having the inserting hole 40 into which the columnar body 3 can be slid and guided, and abutting and supporting the thick part 21 of the plate body 2 from the lower part, and an outer shape holding tool 42 supporting the plate body 2 while upwardly energizing the plate body 2 at the circumferential part of the mounting hole 20. The columnar body 3 is inserted into the mounting hole 20 of the plate body 2 and the inserting hole 40 of the receiving supporting tool 41. The pressure punch 43 is pushed from above, and the thick part 21 is compressively pressed between the pressure punch 43 and the receiving supporting tool 41. Thereby, the thick part 21 is plastically deformed in the center direction of the mounting hole to be bitten into the space S in the circumferential groove 30 of the shaft part opposed to the thick part 21. Finally, the circumferential groove 30 is filled with the thick part 21 to obtain the caulked assembly 1 prepared by firmly integrating the plate body 2 and the columnar body 3.

Figure 40:
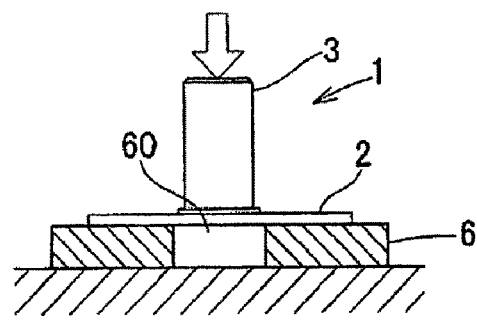
FIG. 40(*a*) shows a test method for push-in strength.
Figure 40:
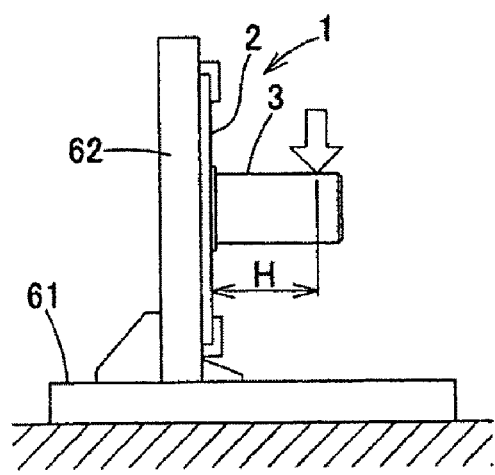
Figure 40:
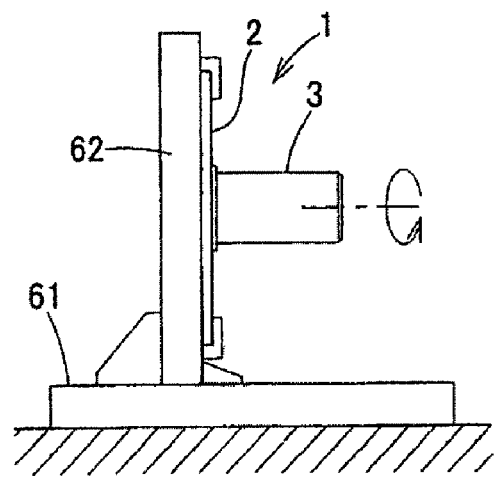

Referring to these examples 9, 10 and comparative examples 1, 2, each of the rotating strength thereof was tested. Referring to the rotating strength, as shown in FIG. 40, the plate body 2 is fixed to the supporting plate 62 upwardly extending from the base 61. The rotation torque is gradually loaded to the columnar body 3 extending in a transverse direction, and the presence or absence of relative rotation of the columnar body is observed.

The result showed that all cleared standard strength (3.0 Nm) as shown in Table 6.

TABLE 6

(Rotation Strength Test Results)

| | Standard | Test result |
|---|---|---|
| Example 9 | 3.0 Nm | Rotation start at 4.0 Nm |
| Example 10 | | Rotation start at 4.0 Nm |
| Comparative example 1 | 3.0 Nm | Rotation start at 4.1 Nm |
| Comparative example 2 | | Rotation start at 4.2 Nm |

Next, referring to the swollen flange formed in example 9 and the cylindrical flange formed in comparative example 1, each of the flat degrees thereof was measured. Specifically, the flange height h was measured at eight different places along the circumferential direction, and the difference between the maximum and the minimum was determined.

Referring to the result, as shown in Table 7, the difference of 0.11 mm in comparative example 1 is suppressed to ½ or less (0.05 mm) in example 9. When the caulked assembly of comparative example 1 is brought into contact with the other part such as a gear, the other part may be damaged. However, it is turned out that problems are hardly occurred even when caulked assembly of example 9 is brought into slide contact with the other part.

TABLE 7

| | Height (Max) (mm) | Height (Min) (mm) | Difference (Max − Min) (mm) |
|---|---|---|---|
| Example 9 | 0.54 | 0.49 | 0.05 |
| Comparative example 1 | 0.65 | 0.54 | 0.11 |

Next, the result of the strength test of each of magnesium alloy caulked assemblies of examples 11 to 14 and comparative example 3 by the conventional caulking method will be described.

In examples 11 to 14, a plate body made of the magnesium alloy is assembled with the end part of a columnar body (shaft body) made of a magnesium alloy by caulking by the method (performing thin plate burring and caulking in a warm state of 300° C.) of the above seventh embodiment. In comparative example 3, a thin plate made of a magnesium alloy is assembled with a magnesium alloy shaft by the caulking method crushing the conventional shaft head part. The outer diameter and length of each of the shaft bodies and the plate thickness of each of the plate bodies are shown in Table 8.

TABLE 8

| | Outer diameter (mm) of shaft body | Shaft length (mm) | Plate thickness (mm) of plate body |
|---|---|---|---|
| Example 11 | 1.67 | 5.0 | 0.2 |
| Example 12 | | 10.0 | 0.2 |
| Example 13 | 3.67 | 5.0 | 0.2 |
| Example 14 | | 10.0 | 0.2 |
| Comparative example 3 | 1.5 | | 0.2 |

Figure 27:
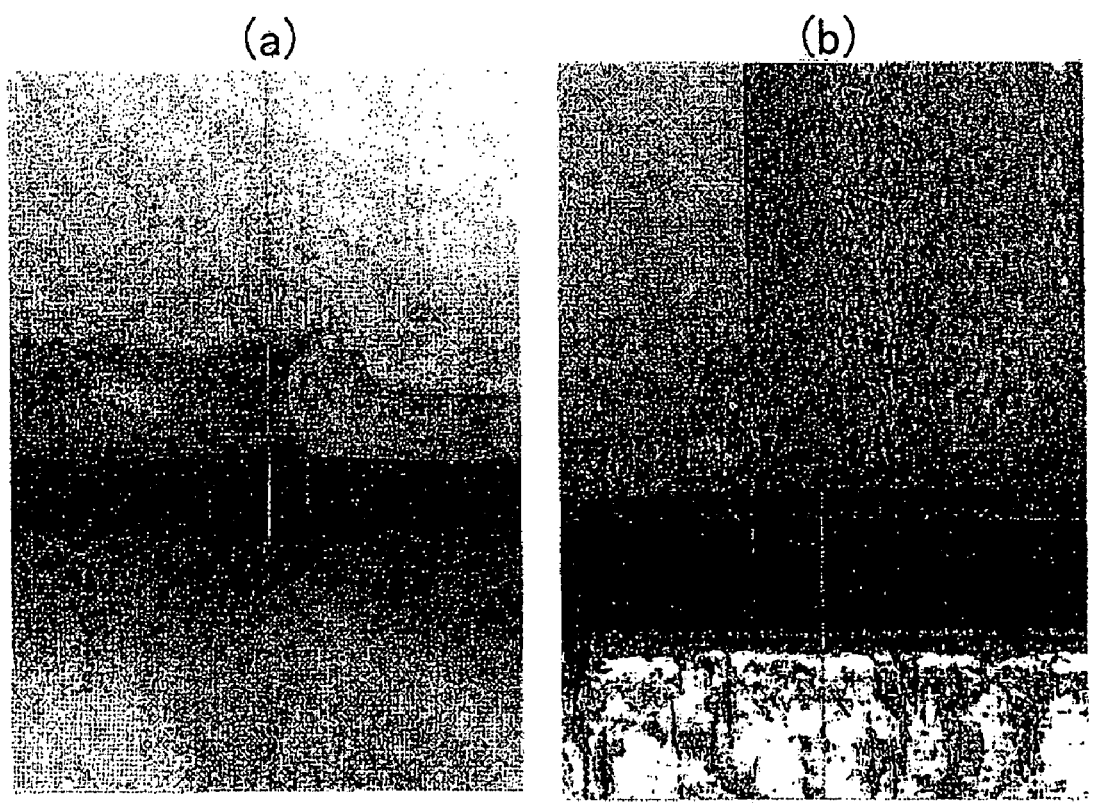
FIG. 27(a) is a sectional photograph of a caulked joint part of example 11.
FIG. 27(b) is a sectional photograph of a caulked joint part of example 13.
Figure 28:
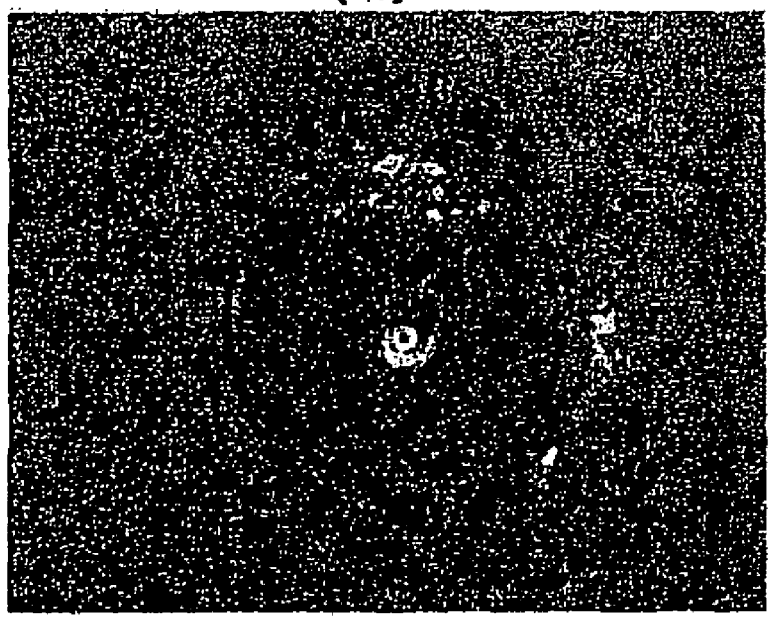
FIG. 28(a) is a photograph showing a caulked part of comparative example 3.
FIG. 28(b) is an enlarged photograph thereof.
Figure 28:
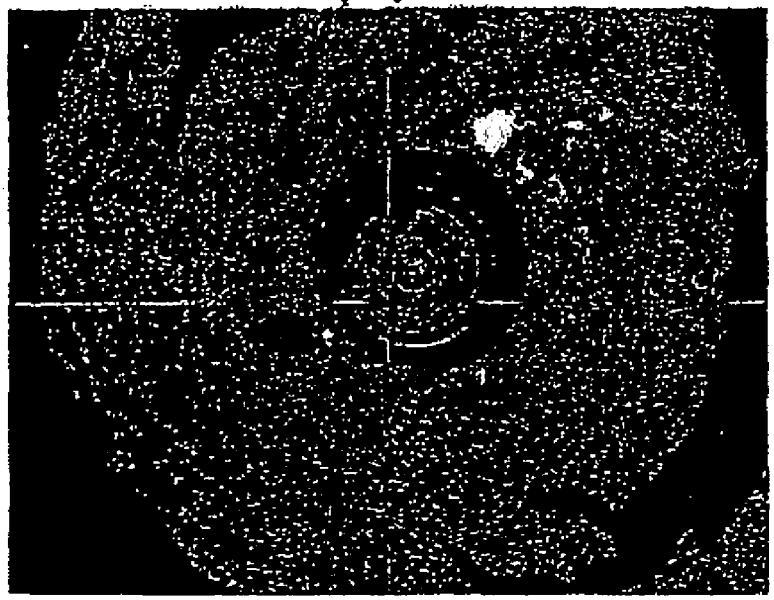

The condition of the caulked part (joined part) after processing is shown in FIGS. 27, 28. FIG. 27(a) shows the caulked part of example 11. FIG. 27(b) shows the caulked part of example 13. FIG. 28 shows the caulked part of comparative example 3. The dashed line shown in FIGS. 27(a), 27(b) shows the extended line of the outer shape of the shaft body. As shown in FIGS. 27(a), 27(b), in the caulked assembly of example, it is turned out that the thick part formed on the magnesium alloy thin plate is plastically deformed and finely fitted into the circumferential groove formed in the end part of the shaft body made of a magnesium alloy, and the thick part and the circumferential groove are certainly assembled without having fracture and crack. On the other hand, since the crack and the fracture arise in the caulked shaft head part in comparative example 3 of FIGS. 28(a), 28(b) (enlarged photograph), the caulked assembly which can be satisfied as a product is not obtained.

Referring to the caulked assembly of examples 11 to 14, the perpendicular degree, push-in strength and rotating strength were respectively tested. The perpendicular degree was defined as the maximum in which X and Y directions were measured. Referring to the push-in strength, as shown in FIG. 40(a), a plate body 2 is placed on a base 6 having an escaping hole 60. The plate body is fixed to the base 6 at a position where a columnar body 3 vertically provided is immediately above the escaping hole. The presence or absence of the omission of the shaft body is observed by amassing a block on the upper end of the shaft body to gradually load the vertical load downward. The numerical value in the omission is recorded. Referring to the rotating strength, as shown in FIG. 40(b), the plate body 2 is fixed to the supporting plate 62 extending upward from the base 61. The presence or absence of relative rotation of the shaft body is observed by gradually loading rotation torque to the shaft body, and the torque numerical value in the rotation start is recorded. Referring to the push-in strength and the rotating strength, the average value of five samples of each of examples was shown in the following Table 9.

The result of each of the tests is shown in Table 9. Sufficient data for commercial production was obtained in each of the tests as the caulked assembly made of magnesium alloy, and high processing performance was shown.

TABLE 9

| | Perpendicular degree (°) | Push-in strength (N) | Rotating strength (gf/cm) |
|---|---|---|---|
| Example 11 | 90.32 | 114.3 | 120 |
| Example 12 | 90.25 | 112.1 | 180 |
| Example 13 | 90.20 | 199.63 | 240 |
| Example 14 | 90.06 | 178.6 | 231 |

Next, referring to each of the assemblies of examples 15, 16, the result of pull-out strength test will be described.

In examples 15, 16, a plate-shaped molded body made of a 30% glass-containing polycarbonate resin (a material often used for lens barrels of digital cameras) is assembled with the end part of a cylindrical shaft body made of a stainless steel material by the method of the above 11th embodiment. The outer diameter of the shaft body and the plate thickness of the plate-shaped molded body are shown in Table 10. Referring to processing conditions, supersonic vibration number, processing time and atmospheric pressure are respectively 40 kHz, 1 second, and 3 kgf/cm$^2$.

TABLE 10

| | Outer diameter (mm) of shaft body | Plate thickness (mm) of plate-shaped molded body |
|---|---|---|
| Example 15 | 2.0 | 0.7 |
| Example 16 | 1.0 | 0.7 |

Referring to the pull-out strength, a plate-shaped molded body was fixed to a base. The shaft body extending upward was held, and pulled directly above. Maximum tension (extraction force) until the shaft body was escaped from the mounting hole of the plate-shaped molded body was measured. The test results were shown in Table 11, and sufficient strength was confirmed.

TABLE 11

| | Extraction force (N) |
|---|---|
| Example 15 | 90 |
| Example 16 | 65.5 |

Figure 39:
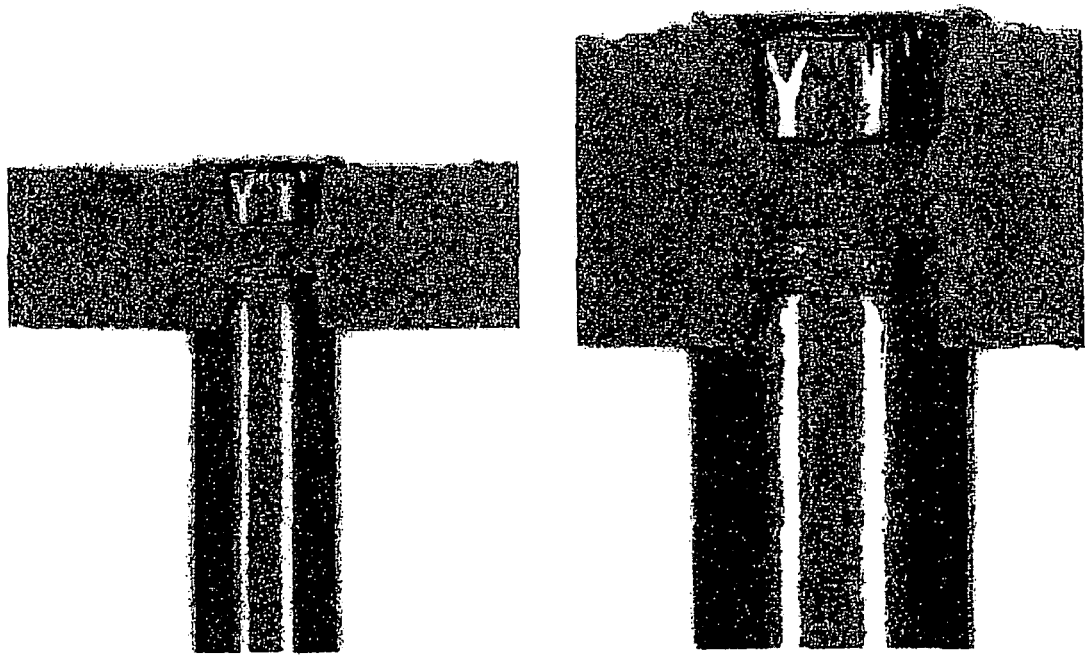
FIG. 39(a) is a sectional photograph of example 17.
FIG. 39(b) is an enlarged photograph thereof.

As example 17, an assembly is prepared by assembling a plate-shaped molded body (plate thickness: 2 mm) made of a polyacetal resin (POM) with the end part of a cylindrical shaft body (outer diameter: 2 mm) made of a stainless steel material is produced by the method of the above 11th embodiment. FIG. 39 shows the sectional photograph cut along the outer circumferential surface of the shaft. The photograph of FIG. 39 shows that the circumferential groove of the shaft body is filled with the material located at the circumferential part of the mounting hole of the plate-shaped molded body, and the shaft body is certainly attached to the plate-shaped molded body by the biting.

As described above, the embodiments of the present invention were described. However, the present invention is not limited to the examples. It is needless to say that the present invention can be carried out in various forms without departing from the spirit of the present invention.

What is claimed is:

1. A method for manufacturing a caulked assembly of a metal plate body with a hollow or solid columnar body, the method comprising the steps of:

forming a mounting hole for inserting and assembling the columnar body in the metal plate body and forming a thick part along an inner circumferential edge of the mounting hole;

forming a circumferential groove with a predetermined depth at an assembled position of an outer circumferential surface of the columnar body inserted into the mounting hole;

inserting the columnar body into the mounting hole of the metal plate body and setting the columnar body to the assembled position where the thick part and the circumferential groove are opposed to each other; and caulking for compressively pressing the thick part from an axial direction of the columnar body to plastically deform the thick part in a center direction of the mounting hole to bite the thick part into the circumferential groove of the columnar body opposed to the thick part.

2. The method for manufacturing the caulked assembly according to claim 1, wherein the thick part of the mounting hole is formed by burring.

3. The method for manufacturing the caulked assembly according to claim 1 or 2, wherein the thick part is compressively pressed by a supporting tool and a pressure punch, the supporting tool having an inserting hole for sliding and guiding the columnar body, and abutting and supporting the thick part of the metal plate body to be set to the columnar body from one side of the axial direction, and the pressure punch pressing the thick part directly or indirectly from the other direction of the axial direction.

4. The method for manufacturing the caulked assembly according to claim 1, wherein a plurality of uneven grooves extending in a direction of crossing a circumferential direction are formed over the whole circumference in the circumferential groove of the columnar body by uneven working.

5. A method for manufacturing a caulked assembly of a metal plate body with a hollow or solid columnar body, the method comprising the steps of:

forming a mounting hole for inserting and assembling the columnar body in the metal plate body by burring and forming a thick part composed of a cylindrical flange by burring along an inner circumferential edge of the mounting hole;

forming a circumferential groove with a predetermined depth at an assembled position of an outer circumferential surface of the columnar body inserted into the mounting hole;

inserting the columnar body into the mounting hole of the metal plate body to set the columnar body to the assembled position where the thick part and the circumferential groove are opposed to each other; and caulking for compressively pressing the thick part from an axial direction to pressurize the cylindrical flange to make the surface of the thick part approximately flush with that of the metal plate body, forming a ring-shaped swollen flange along the outer circumferential surface of the columnar body on a surface opposite to a surface on which the cylindrical flange is projected, and simultaneously, plastically deforming the swollen flange in a center direction of the mounting hole to bit the swollen flange into the circumferential groove of the columnar body opposed to the swollen flange.

6. The method for manufacturing the caulked assembly according to claim 5, wherein the thick part is compressively pressed from the axial direction by a supporting tool and a pressure punch, the supporting tool having an inserting hole for sliding and guiding the columnar body, having a notch groove for forming the swollen flange on an opening edge part of the inserting hole, and abutting and supporting a surface opposite to a surface on which a cylindrical flange of the metal plate body to be set to the columnar body is projected, and the pressure punch pressing the thick part directly or indirectly from the side on which the cylindrical flange is projected.

7. The method for manufacturing the caulked assembly according to claim 6, wherein the supporting tool supports the columnar body in the inserting hole so that the columnar body is integrally moved with the end surface thereof abutting on the pressure punch, and the metal plate body is assembled with the columnar body so that the metal plate body is made approximately flush with the end surface of the columnar body by pressing the thick part of the metal plate body by the pressure punch.

8. A method for manufacturing a caulked assembly of a plate body made of magnesium or a magnesium alloy with a hollow or solid columnar body, the method comprising the steps of:

forming a mounting hole for inserting and assembling the columnar body into the plate body and forming a thick part along an inner circumferential edge of the mounting hole by warm pressing;

forming a circumferential groove with a predetermined depth at an assembled position of an outer circumferential surface of the columnar body inserted into the mounting hole;

inserting the columnar body into the mounting hole of the plate body and setting the columnar body to the assembled position where the thick part and the circumferential groove are opposed to each other; and caulking for compressively pressing the thick part from an axial direction of the columnar body to plastically deform the thick part in a center direction of the mounting hole to bite the thick part into the circumferential groove of a shaft part opposed to the thick part.

9. The method for manufacturing the caulked assembly according to claim 8, wherein the thick part of the mounting hole is formed by warm burring.

10. The method for manufacturing the caulked assembly according to claim 8 or 9, wherein the thick part is compressively pressed from the axial direction in warm state in the caulking step.

11. The method for manufacturing the caulked assembly according to claim 8, wherein the thick part is compressively pressed by a heated supporting tool and a heated pressure punch, the supporting tool having an inserting hole for sliding and guiding the shaft part, and abutting and supporting the thick part of the plate body to be set to the shaft part from one side of the axial direction, and the pressure punch pressing the thick part directly or indirectly from the other direction of the axial direction.

12. A method for manufacturing an assembly of a resin molded body made of a thermoplastic resin with a hollow or solid columnar body made of a material having a higher melting point than that of the thermoplastic resin, comprising the steps of:

forming a through or bottomed mounting hole for inserting and assembling the columnar body in the resin molded body;

forming a circumferential groove with a predetermined depth at an assembled position of an outer circumferential surface of the columnar body inserted into the mounting hole;

inserting the columnar body into the mounting hole of the resin molded body and setting the columnar body to the assembled position where an inner circumferential surface of the mounting hole and the circumferential groove of the columnar body are opposed to each other; and applying compressive force to a circumferential part of the mounting hole of the resin molded body from the axial direction, applying supersonic vibration from a surface to be compressed, and making a material melted by supersonic vibration heat and located at the circumferential part of the mounting hole flow into the circumferential groove of the columnar body by the compressive force to fix the columnar body to the mounting hole of the resin molded body.

13. The method for manufacturing the assembly of the resin molded body with the columnar body according to claim 12, wherein the circumferential part of the mounting hole is compressed in the axial direction by a supporting tool and a pressure tool, the supporting tool having an inserting hole for sliding and guiding the columnar body, and abutting and supporting the circumferential part of the mounting hole of the resin molded body set to the columnar body from one side of the axial direction, and the pressure tool pressing the circumferential part of the mounting hole from the other direction of the axial direction, and supersonic vibration is applied from the compressed surface, abutting on the circumferential part of the mounting hole in at least one of the supporting tool and pressure tool.

14. The method for manufacturing the assembly of the resin molded body with the columnar body according to claim 12 or 13, wherein a supporting surface which supports an outer surface of the resin molded body and an embedded part which is projected from the supporting surface and is embedded in the resin molded body are provided on the compressed surface applying the supersonic vibration; a material pushed aside by the embedded part is moved toward an inside of the mounting hole by applying the supersonic vibration and the compressive force; and a material located at the circumferential part of the mounting hole is press-fitted into the circumferential groove.

* * * * *